United States Patent
Urano et al.

(10) Patent No.: US 10,310,511 B2
(45) Date of Patent: Jun. 4, 2019

(54) AUTOMATIC DRIVING CONTROL SYSTEM OF MOBILE OBJECT

(71) Applicant: TOYOTA JIDOSHA KABUSHIKI KAISHA, Toyota-shi, Aichi-ken (JP)

(72) Inventors: Hiromitsu Urano, Numazu (JP); Taisuke Sugaiwa, Susono (JP); Kunihito Sato, Mishima (JP); Kentaro Ichikawa, Shizuoka-ken (JP); Kohei Otsuka, Susono (JP); Bunyo Okumura, Susono (JP); Maiko Hirano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/490,996

(22) Filed: Apr. 19, 2017

(65) Prior Publication Data
US 2017/0308093 A1   Oct. 26, 2017

(30) Foreign Application Priority Data
Apr. 20, 2016  (JP) .................. 2016-084544

(51) Int. Cl.
*G05D 1/02*  (2006.01)
*G01C 21/34*  (2006.01)

(52) U.S. Cl.
CPC .......... *G05D 1/0274* (2013.01); *G01C 21/34* (2013.01); *G05D 1/0248* (2013.01); *G05D 1/0257* (2013.01); *G05D 1/0278* (2013.01)

(58) Field of Classification Search
CPC .. G05D 1/0274; G05D 1/0278; G05D 1/0248; G01C 21/34

USPC ......................................................... 701/25
See application file for complete search history.

(56) References Cited

U.S. PATENT DOCUMENTS

| | | | |
|---|---|---|---|
| 2011/0082585 A1 | 4/2011 | Sofman et al. | |
| 2013/0223686 A1 | 8/2013 | Shimizu et al. | |
| 2013/0326425 A1* | 12/2013 | Forstall | G01C 21/3638 715/851 |
| 2014/0309815 A1* | 10/2014 | Ricci | H04W 4/21 701/2 |

(Continued)

FOREIGN PATENT DOCUMENTS

| | | |
|---|---|---|
| JP | 2003-345438 A | 12/2003 |
| JP | 2009-104531 A | 5/2009 |

(Continued)

*Primary Examiner* — Tuan C To
(74) *Attorney, Agent, or Firm* — Sughrue Mion, PLLC

(57) ABSTRACT

An automatic operation control system of a mobile object includes an environment map storage unit configured to store environment map information and an electronic control unit configured to include an impassable region determining unit. The environment map information includes position information indicating a plurality of positions in a space and a state quantity variability of each of the plurality of positions, the state quantity variability is correlated with the corresponding position information, and the state quantity variability indicates a variation tendency of a state quantity of the corresponding position with respect to time. The impassable region determining unit is configured to determine an impassable region which is unsuitable for movement of the mobile object on the basis of the state quantity variability of the environment map information.

8 Claims, 30 Drawing Sheets

(56) References Cited

U.S. PATENT DOCUMENTS

| | | | |
|---|---|---|---|
| 2014/0365120 A1* | 12/2014 | Vulcano | G01C 21/36 |
| | | | 701/532 |
| 2016/0207538 A1* | 7/2016 | Urano | B60W 30/182 |
| 2016/0231744 A1* | 8/2016 | Kaname | G05D 1/0088 |
| 2016/0259334 A1* | 9/2016 | Hashimoto | B60W 50/082 |
| 2016/0304089 A1* | 10/2016 | Miura | B60W 30/08 |
| 2016/0311431 A1* | 10/2016 | Kato | B62D 1/28 |
| 2016/0330534 A1* | 11/2016 | White, Jr. | H04Q 9/00 |
| 2016/0355178 A1* | 12/2016 | Shiraishi | B60W 30/06 |
| 2017/0122751 A1* | 5/2017 | Li | G01C 21/32 |
| 2017/0124476 A1* | 5/2017 | Levinson | G05D 1/0088 |
| 2017/0124781 A1* | 5/2017 | Douillard | G01S 15/931 |
| 2018/0273031 A1* | 9/2018 | Fujita | G01C 21/3667 |

FOREIGN PATENT DOCUMENTS

| | | | |
|---|---|---|---|
| JP | 4850545 B2 * | 1/2012 | |
| JP | 5475138 B2 | 4/2014 | |
| JP | 2014219723 A | 11/2014 | |
| JP | 2015137929 A * | 7/2015 | |
| JP | 2017-194527 A | 10/2017 | |
| KR | 101200680 B1 * | 11/2012 | |
| KR | 101382982 B1 | 4/2014 | |

* cited by examiner

AUTOMATIC DRIVING CONTROL SYSTEM OF MOBILE OBJECT

INCORPORATION BY REFERENCE

The disclosure of Japanese Patent Application No. 2016-084544 filed on Apr. 20, 2016 including the specification, drawings and abstract is incorporated herein by reference in its entirety.

BACKGROUND

1. Technical Field

The disclosure relates to an automatic driving control system of a mobile object.

2. Description of Related Art

As a mobile robot that moves in a room, a mobile robot that stores map information including information of the position and size of an obstacle such as a piece of furniture in a room, determines a moving route for moving from a current position to a destination while avoiding the piece of furniture using the map information, and moves in the room along the moving route is known (see Japanese Patent Application Publication No. 2003-345438 A (JP 2003-345438 A)).

SUMMARY

When the obstacle in the room is a static obstacle of which the position is rarely changes such as a bed and the map information includes information of the position and size of the obstacle, the mobile robot may move while avoiding the obstacle. However, when the obstacle is a static obstacle of which the position changes relatively frequently such as a chair or a trashcan and the static obstacle is located at a certain position at a certain time, a possibility of the static obstacle being at the certain position at another time is low and a possibility of the static obstacle being at a position other than the certain position at another time is high. When the obstacle is a dynamic obstacle such as a person or a pet, a possibility of the position changing is even higher.

The map described in JP 2003-345438 A merely includes information on the position and size of an obstacle at a time at which the map information is prepared. Accordingly, in JP 2003-345438 A, the position of an obstacle which changes with the lapse of time, that is, a situation in the room, may not be accurately ascertained. In other words, when the map information includes only the information on the position and the size of the obstacle, it is difficult to accurately ascertain a situation in a space in which the mobile robot moves.

When an area which is not suitable for movement of a mobile object in a space is defined as an impassable area, the disclosure provides an automatic operation control system of a mobile object that can accurately determine an impassable area.

According to a first aspect of the disclosure, an automatic operation control system of a mobile object includes an environment map storage unit configured to store environment map information and an electronic control unit configured to include an impassable region determining unit. The environment map information includes position information indicating a plurality of positions in a space and a state quantity variability of each of the plurality of positions, the state quantity variability is correlated with the corresponding position information, and the state quantity variability indicates a variation tendency of a state quantity of the corresponding position with respect to time. The impassable region determining unit is configured to determine an impassable region which is unsuitable for movement of the mobile object on the basis of the state quantity variability of the environment map information.

According to the above-mentioned configuration, it is possible to more accurately determine the impassable region.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
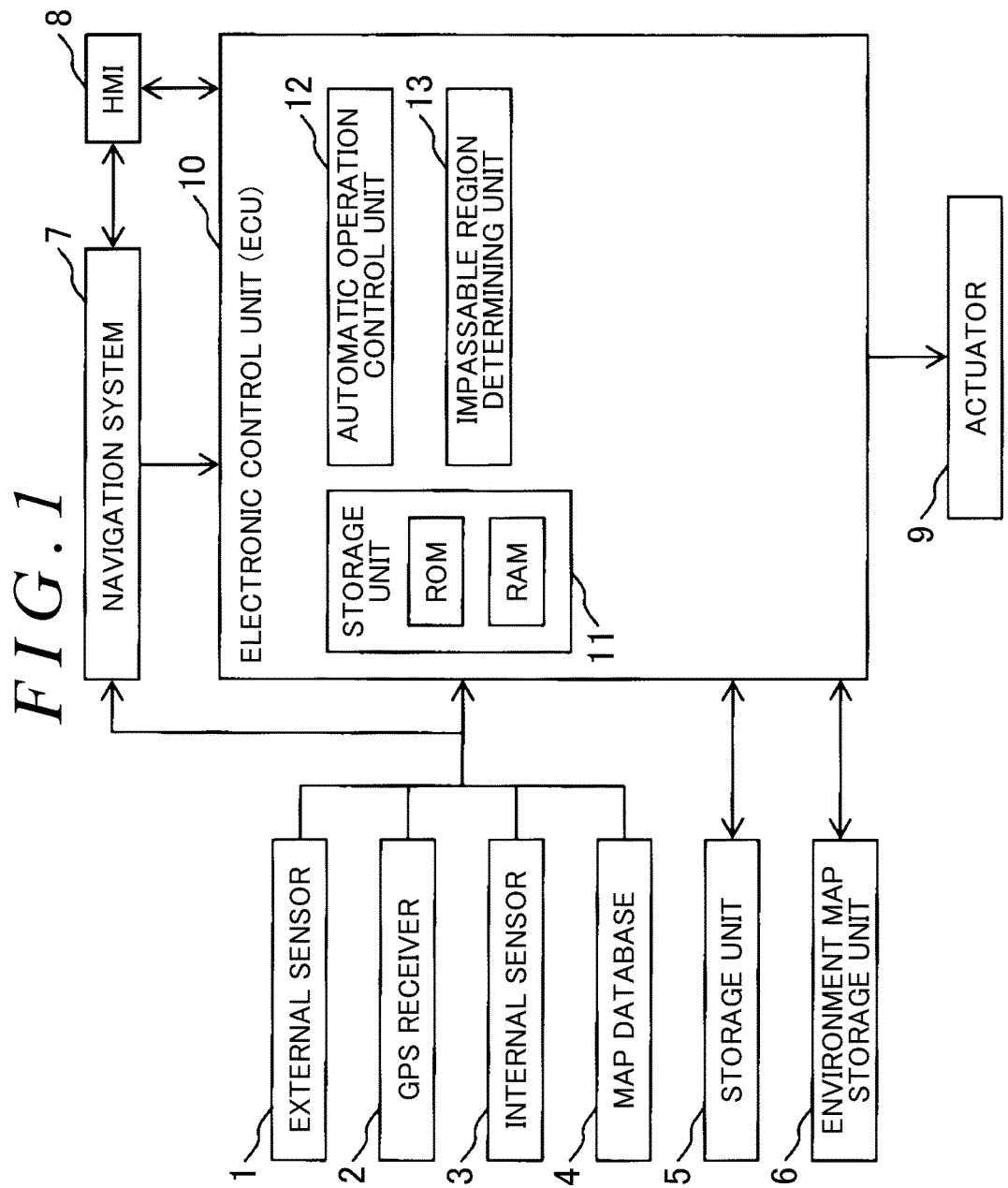
FIG. 1 is a block diagram illustrating an automatic operation control system of a mobile object according to a first embodiment of the disclosure.

FIG. 1 illustrates a block diagram of an automatic operation control system of a mobile object according to a first embodiment of the disclosure. Examples of the mobile object include a vehicle or a mobile robot. In the following description, it is assumed that the mobile object is a vehicle. Referring to FIG. 1, an automatic operation control system of a vehicle includes an external sensor 1, a GPS receiver 2, an internal sensor 3, a map database 4, a storage unit 5, an environment map storage unit 6, a navigation system 7, a human-machine interface (HMI) 8, various actuators 9, and an electronic control unit (ECU) 10.

Figure 2:
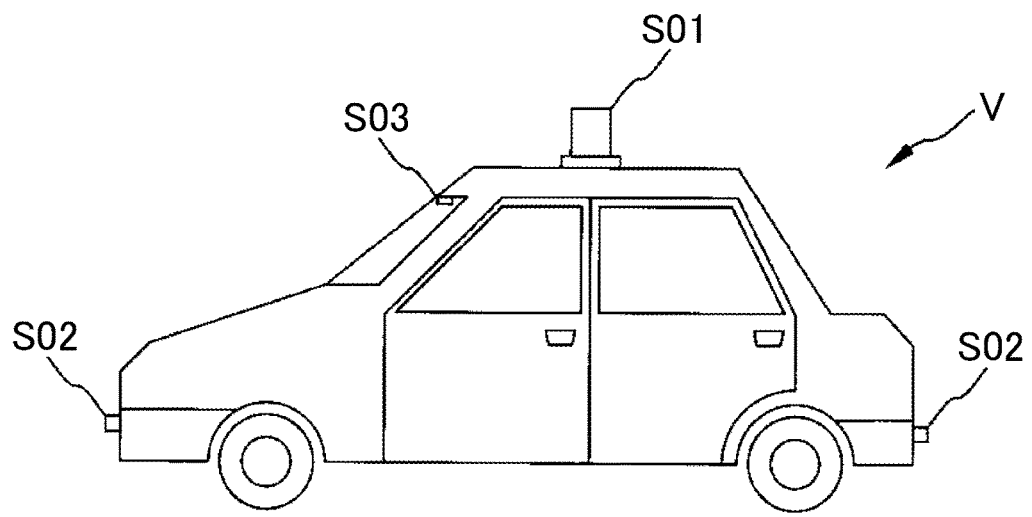
FIG. 2 is a schematic diagram illustrating an external sensor.

The external sensor 1 is a detection device that detects information of the outside or the surroundings of the vehicle. The external sensor 1 includes at least one of a laser imaging detection and ranging (LIDAR), a radar, and a camera. In the first embodiment of the disclosure, as illustrated in FIG. 2, the external sensor 1 includes at least one LIDAR SO1, at least one radar SO2, and at least one camera SO3.

The LIDAR SO1 is a device that detects an object outside the vehicle V using a laser beam. In the first embodiment of the disclosure, examples of the object include a static object which is an immovable object (such as a building or a road), a dynamic object which is a movable object (such as another vehicle or a pedestrian), and a quasi-static object which is an object that is basically immovable but can be easily moved (such as a standing signboard, a trashcan, or a tree branch). In the example illustrated in FIG. 2, a single LIDAR SO1 is installed on the roof of the vehicle V. In another embodiment (not illustrated), for example, four LIDARs are attached to bumpers at four corners of the vehicle V. The LIDARs SO1 emit laser beams in all directions from the vehicle V and measure information on objects from the reflected beams thereof. The object information includes a distance and a direction from the corresponding LIDAR SO1 to the object, that is, a relative position of the object to the LIDAR SO1. The object information detected by the LIDARs SO1 is transmitted to the electronic control unit 10. On the other hand, the radar SO2 is a device that detects an object outside the vehicle V using radio waves. In the example illustrated in FIG. 2, for example four radars SO2 are attached to the bumpers at four corners of the vehicle V. The radars SO2 emit radio waves from the radars SO2 in all directions from the vehicle V and measures information on an obstacle near the vehicle V from reflected waves thereof. The object information detected by the radar SO2 is transmitted to the electronic control unit 10. In the example illustrated in FIG. 2, the camera SO3 includes a single stereo camera installed inside a front glass of the vehicle V. The stereo camera SO3 photographs the front side of the vehicle V in a color or monochrome manner and the color or monochrome photographing information from the stereo camera SO3 is transmitted to the electronic control unit 10.

Referring to FIG. 1 again, the GPS receiver 2 receives signals from three or more GPS satellites and detects information indicating an absolute position of the vehicle or the external sensor 1 (for example, latitude, longitude, and altitude of the vehicle V) therefrom. The absolute position information of the vehicle detected by the GPS receiver 2 is transmitted to the electronic control unit 10.

The internal sensor 3 is a detection device that detects a travel condition of the vehicle V. The travel condition of the vehicle V is expressed by at last one of a speed, an acceleration, and a posture of the vehicle. The internal sensor 3 includes one or both of a vehicle speed sensor and an inertial measurement unit (IMU). In the first embodiment of the disclosure, the internal sensor 3 includes the vehicle speed sensor and the IMU. The vehicle speed sensor detects the speed of the vehicle V. The IMU includes, for example, a three-axis gyro and a three-direction acceleration sensor, detects three-dimensional angular velocity and acceleration of the vehicle V, and detects the acceleration and the posture of the vehicle V on the basis thereof. The travel condition information of the vehicle V detected by the internal sensor 3 is transmitted to the electronic control unit 10.

The map database 4 is a database of map information. The map database 4 is stored, for example, in a hard disk drive (HDD) mounted in the vehicle. The map information includes, for example, position information of roads and shape information of the roads (for example, types of curves and linear parts, curvatures of the curves, intersections, and positions of merging points and branching points).

The storage unit 5 stores three-dimensional images of objects detected by the LIDAR SO1 and road maps dedicated to automatic operation which is prepared on the basis of the detection result of the LIDAR SO1. The three-dimensional images of objects and the road maps are continuously or periodically updated.

The environment map storage unit 6 stores environment map information (which will be described later).

The navigation system 7 is a device that guides the vehicle V to a destination which is set by a driver of the vehicle V using the HMI 8. The navigation system 7 computes a target route to a destination on the basis of current position information of the vehicle V detected by the GPS receiver 2 and the map information of the map database 4. Information on the target route of the vehicle V is transmitted to the electronic control unit 10.

The HMI 8 is an interface that is used to output and input information between an occupant of the vehicle V and the automatic operation control system of the vehicle. In the first embodiment of the disclosure, the HMI 8 includes a display that displays characters or image information, a speaker that generates sound, and operation buttons or a touch panel used for an occupant to perform an input operation.

The actuator 9 is a device that controls a traveling operation of the vehicle V in accordance with a control signal from the electronic control unit 10. The traveling operation of the vehicle V includes driving, braking, and steering. The actuator 9 includes at least one of a driving actuator, a braking actuator, and a steering actuator. The driving actuator controls output power of an engine or an electric motor that provides a driving force of the vehicle V, thereby controlling the driving operation of the vehicle V. The braking actuator operates a braking device of the vehicle V, thereby controlling the braking operation of the vehicle V. The steering actuator operates a steering device of the vehicle V, thereby controlling the steering operation of the vehicle V.

When an occupant performs an input operation of starting automatic operation using the HMI 8 in a state in which the automatic operation is possible, a signal is sent to the electronic control unit 10 to start the automatic operation. That is, driving, braking, and steering, which are the traveling operations of the vehicle V, are controlled by the actuator 9. On the other hand, when the occupant performs an input operation of stopping the automatic operation using the HMI 8, a signal is sent to the electronic control unit 10 to stop the automatic operation and a manual operation in which at least one of the traveling operations of the vehicle V is performed by a driver is started. In other words, the automatic operation is switched to the manual operation. When the traveling operation of the vehicle V is performed by the driver in the automatic operation, that is, when the driver operates a steering wheel by a predetermined threshold quantity or more, when the driver operates an accelerator pedal by a predetermined threshold quantity or more, or when the driver operates a brake pedal by a predetermined threshold quantity or more, the automatic operation is switched to the manual operation. When the automatic operation is determined to be difficult in the automation operation, the manual operation is requested to the driver via the HMI 7.

The electronic control unit 10 is a computer including a central processing unit (CPU), a read only memory (ROM), and a random access memory (RAM) which are connected to one another by bidirectional buses. As illustrated in FIG. 1, the electronic control unit 10 according to the first embodiment of the disclosure includes a storage unit 11 including the ROM and the RAM, an automatic operation control unit 12, and an impassable region determining unit 13.

The automatic operation control unit 12 is configured to control the automatic operation of the vehicle V. On the other hand, the impassable region determining unit 13 is configured to determine an impassable region which is unsuitable for movement of the vehicle V.

Figure 3:
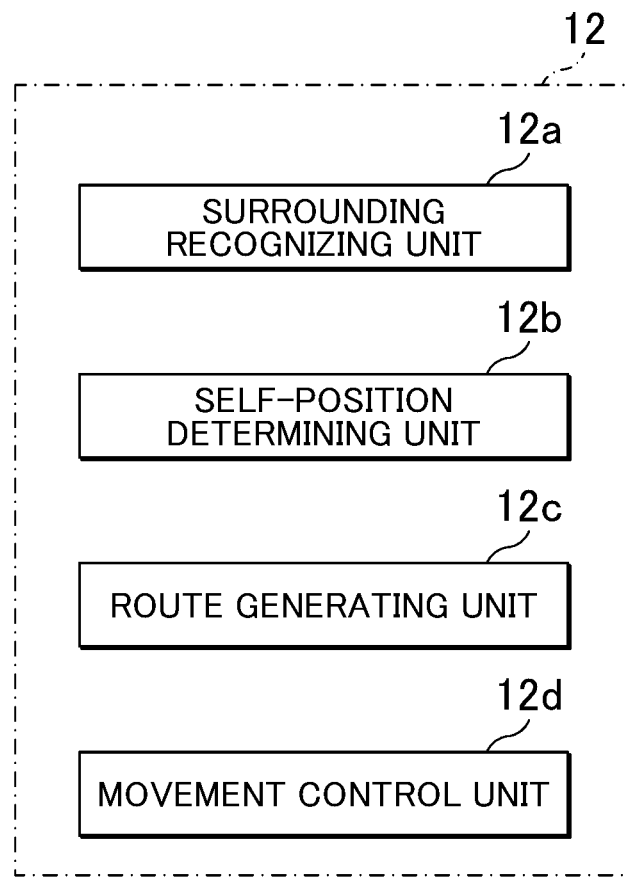
FIG. 3 is a block diagram of an automatic operation control unit according to the first embodiment of the disclosure.

In the first embodiment of the disclosure, the automatic operation control unit 12 includes a surrounding recognizing unit 12a, a self-position determining unit 12b, a route generating unit 12c, and a movement control unit 12d as illustrated in FIG. 3.

The surrounding recognizing unit 12a is configured to recognize a situation of surroundings of the vehicle V using the external sensor 1. That is, the surrounding recognizing unit 12a recognizes the situation of the surroundings of the vehicle V on the basis of the detection result of the external sensor 1 (for example, three-dimensional image information of an object from the LIDAR SO1, object information from the radar SO2, and photographing information from the camera SO3). Examples of the external situation include a position of a white line of a travel lane relative to the vehicle V, a position of a lane center relative to the vehicle V, a road width, a road shape (for example, a curvature of a travel lane and a gradient variation of a road surface), and a situation of an object near the vehicle V (for example, information for distinguishing a static object and a dynamic object, a position of the object relative to the vehicle V, a moving direction of the object relative to the vehicle V, and a relative speed of the object to the vehicle V).

The self-position determining unit 12b is configured to determine an absolute position of the vehicle V. That is, the self-position determining unit 12b calculates an accurate absolute position of the vehicle V on the basis of a rough position of the vehicle V from the GPS receiver 2, a surrounding situation of the vehicle recognized by the surrounding recognizing unit 12a, and the object information and the road map dedicated to automatic operation stored in the storage unit 5.

Figure 4:
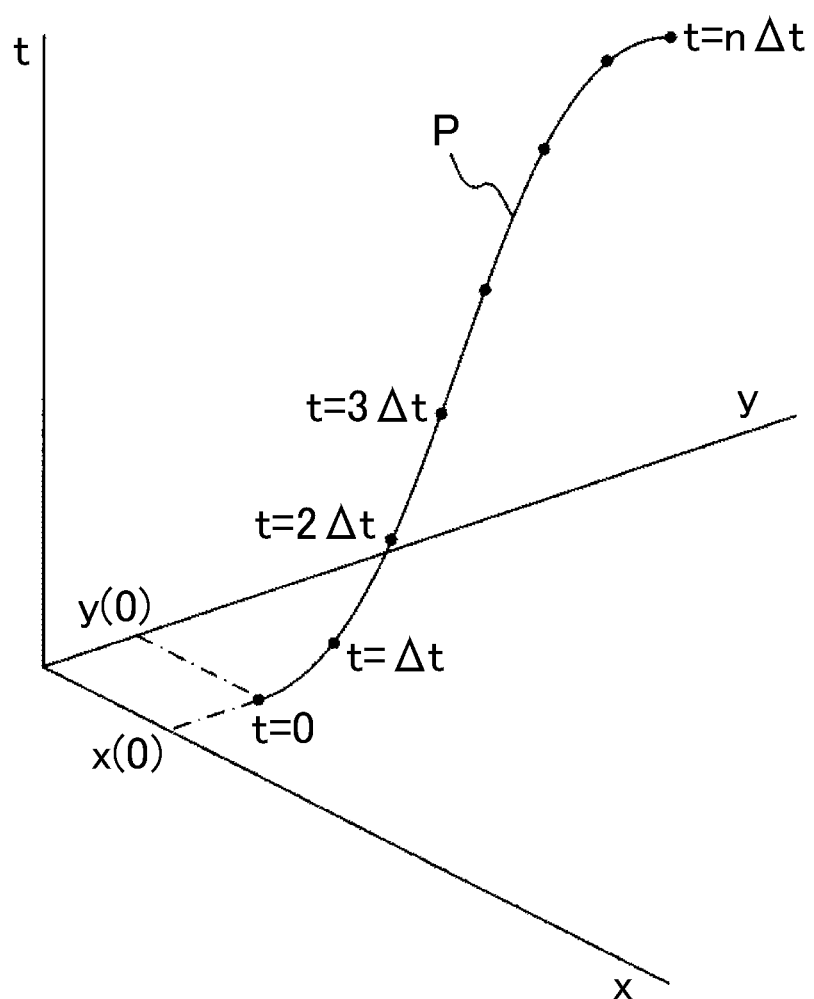
FIG. 4 is a diagram illustrating a route.

The route generating unit 12c is configured to generate a route of the vehicle V. In the first embodiment of the disclosure, a route includes information indicating a time t, information indicating the absolute position (x(t), y(t)) of the vehicle at the time t, and information indicating a travel condition of the vehicle at the time t (for example, a combination (t, x(t), y(t), v(t), and $\theta(t)$) of information indicating a speed v(t) and a travel direction $\theta(t)$). Here, x(t) is represented, for example, by latitude, and y(t) is represented, for example, by longitude. For example, first, a combination ($\Delta t$, x($\Delta t$), y($\Delta t$), v($\Delta t$), and $\theta(\Delta t)$) after a time $\Delta t$ elapses is calculated using a combination (0, x(0), y(0), v(0), and $\theta(0)$) at a current time (t=0). Subsequently, a combination ($2\Delta t$, x($2\Delta t$), y($2\Delta t$), v($2\Delta t$), and $\theta(2\Delta t)$) after a time $\Delta t$ additionally elapses is calculated. Subsequently, a combination (n$\Delta t$, x(n$\Delta t$), y(n$\Delta t$), v(n$\Delta t$), and $\theta(n\Delta t)$) after a time n$\Delta t$ additionally elapses is calculated. Examples of the combination are illustrated in FIG. 4. That is, in FIG. 4, examples of the above-mentioned combination (t, x(t), y(t), v(t), and $\theta(t)$) are plotted in a three-dimensional space defined by the time t and the absolute position (x(t), y(t)) of the vehicle V. As illustrated in FIG. 4, a curve obtained by sequentially connecting a plurality of combinations (t, x(t), y(t), v(t), and $\theta(t)$) constitutes a route P.

In the first embodiment of the disclosure, the route generating unit 12c generates a route P on the basis of the impassable region determined by the impassable region determining unit 13.

The movement control unit 12d is configured to control movement of the vehicle V. Specifically, the movement control unit 12d is configured to control the vehicle V to move along the route P generated by the route generating unit 12c. That is, the movement control unit 12d controls the actuator 9 to realize the combinations (t, x(t), y(t), v(t), and θ(t)) of the route P, thereby controlling driving, braking, and steering of the vehicle V.

In the first embodiment of the disclosure, the impassable region determining unit 13 is configured to determine the impassable region on the basis of environment map information in the environment map storage unit 6. The environment map information according to the first embodiment of the disclosure will be described below.

Figure 5:
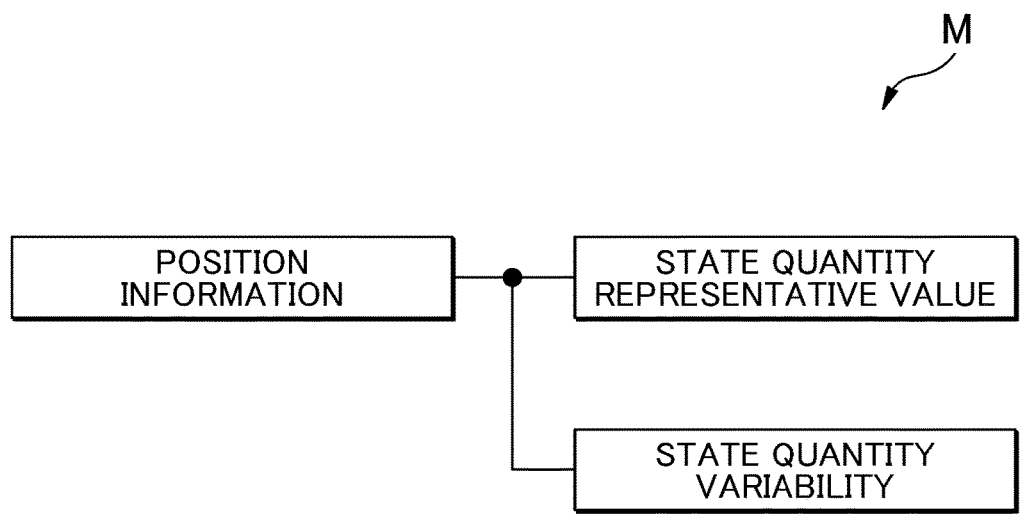
FIG. 5 is a schematic diagram illustrating environment map information according to the first embodiment of the disclosure.

FIG. 5 schematically illustrates environment map information M according to the first embodiment of disclosure. The environment map information M according to the first embodiment of the disclosure includes position information indicating each of a plurality of positions in a space, a state quantity representative value correlated with the corresponding position information, and a state quantity variability correlated with the corresponding position information as illustrated in FIG. 5. In the first embodiment of the disclosure, the above-mentioned space is a three-dimensional space. In another embodiment (not illustrated), the space may be a two-dimensional space.

The state quantity representative value and the state quantity variability of a certain position are calculated on the basis of the state quantity of the certain position. In the first embodiment of the disclosure, a state quantity of a certain position is expressed by a presence probability of an object at the certain position. In this case, the state quantity is calculated, for example, in the form of a continuous value from zero to 1. In another embodiment (not illustrated), the state quantity may be calculated in the form of a discrete value.

The state quantity representative value of a certain position is a numerical value appropriately indicating a state of the certain position. In the first embodiment of the disclosure, the state quantity representative value is calculated, for example, in the form of a continuous value between zero and 1. In another embodiment (not illustrated), the state quantity representative value is calculated in the form of a discrete value.

Figure 6A:
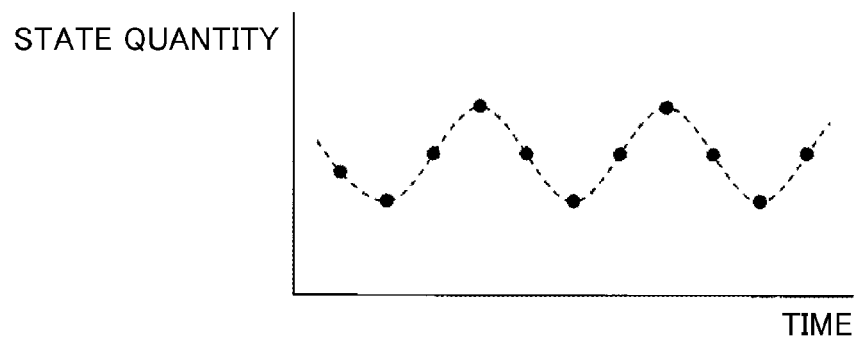
FIG. 6A is a diagram illustrating an example of a variation of a state quantity with respect to time.

On the other hand, the state quantity variability of a certain position is a numerical value indicating a variation tendency of the state quantity of the certain position with respect to time. In the first embodiment of the disclosure, the state quantity variability is calculated in the form of a continuous value. In another embodiment (not illustrated), the state quantity variability is calculated in the form of a discrete value. The state quantity variability will be additionally described with reference to FIGS. 6A, 6B, and 6C. Detected state quantities are plotted in FIGS. 6A, 6B, and 6C.

Figure 6B:
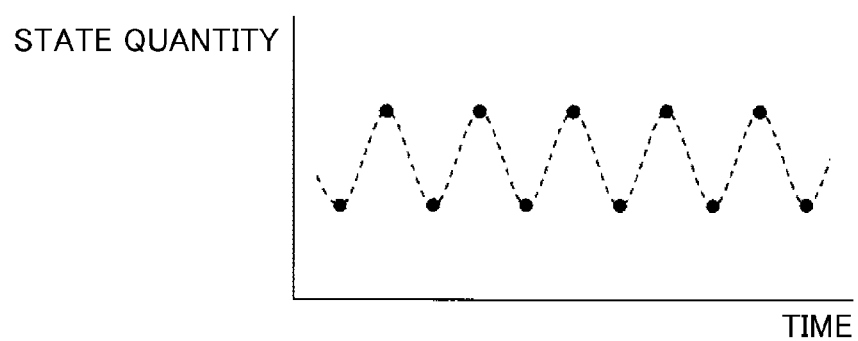
FIG. 6B is a diagram illustrating another example of the variation of the state quantity with respect to time.
Figure 6C:
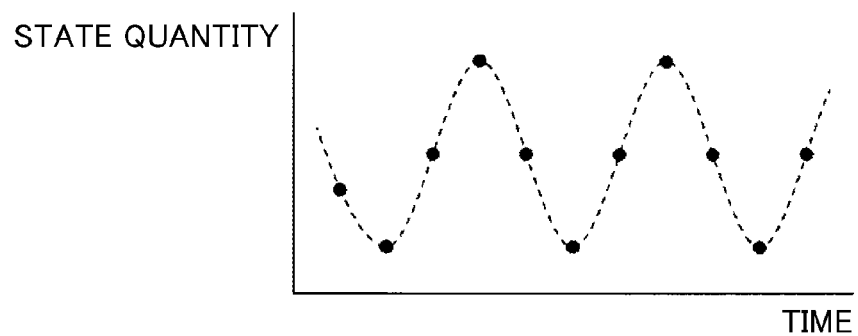
FIG. 6C is a diagram illustrating still another example of the variation of the state quantity with respect to time.

The state quantity variability is expressed, for example, by a frequency of variation or a degree of variation of the state quantity with respect to time. That is, the state quantity in the example illustrated in FIG. 6B has a higher frequency of variation and a higher variation tendency with respect to time than the state quantity in the example illustrated in FIG. 6A. Accordingly, the state quantity variability in the example illustrated in FIG. 6B is higher than the state quantity variability in the example illustrated in FIG. 6A. On the other hand, the state quantity in the example illustrated in FIG. 6C has a higher frequency of variation and a higher variation tendency with respect to time than the state quantity in the example illustrated in FIG. 6A. Accordingly, the state quantity variability in the example illustrated in FIG. 6C is higher than the state quantity variability in the example illustrated in FIG. 6A.

A preparation example of the environment map information M will be described below. In the preparation example, an environment map preparing system including an environment detector that detects position information indicating a position in a space and a state quantity of the position, an environment map storage unit, and an electronic control unit for preparation of an environment map is used. The electronic control unit includes an environment detecting unit configured to detect position information indicating a position and a state quantity of the position at different times for each of a plurality of positions in a space using the environment detector, a state quantity calculating unit configured to calculate the state quantity representative value using the detected state quantity for each of the plurality of positions, a variability calculating unit configured to calculate the state quantity variability using the detected state quantity for each of the plurality of positions, and a storage unit configured to store the state quantity representative value and the state quantity variability in correlation with the corresponding position information in the environment map storage unit. The environment map information M is prepared by the environment map preparing system. The environment map preparing system is mounted on a mobile object such as a vehicle. The environment detector includes, for example, an external sensor (such as a LIDAR) that detects an object near the environment map preparing system, an internal sensor, and a GPS receiver that detects an absolute position of the environment map preparing system.

Figure 7:
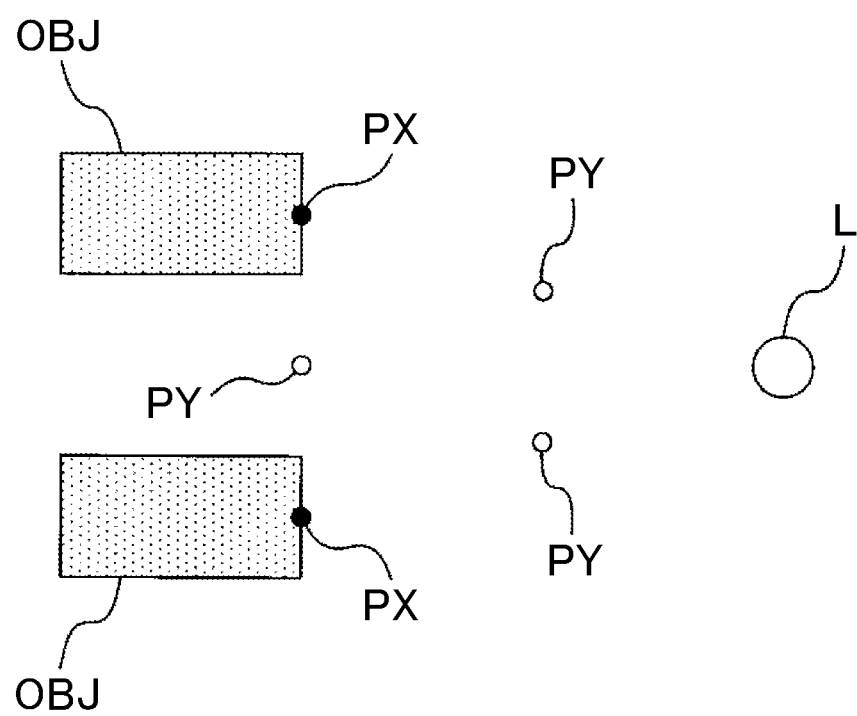
FIG. 7 is a schematic diagram illustrating a method of detecting position information and a state quantity.

FIG. 7 illustrates a case in which a laser beam emitted from the LIDAR L of the environment map preparing system is reflected by an object OBJ. In this case, as indicated by a black circle in FIG. 7, a reflecting point is formed at a position PX. The LIDAR L measures relative position information of the position PX of the reflecting point. It can be seen from the measurement result that the object OBJ is present at the position PX, and thus the state quantity, that is, the object presence probability, of the position PX is 1. The absolute position information of the position PX can be seen from the relative position information of the position PX from the LIDAR L and the absolute position information of the environment map preparing system from the GPS receiver of the environment map preparing system. It can be seen that no object is present at a position PY which is not the reflecting point and which is indicated by a white circle in FIG. 7, and thus the state quantity, that is, the object presence probability, of the position PY is zero. The absolute position information of the position PY can be seen from the relative position information of the position PX from the LIDAR L and the absolute position information of the environment map preparing system from the GPS receiver of the environment map preparing system. In this way, the absolute position information and the state quantities of the positions PX and PY are calculated.

Figure 8A:
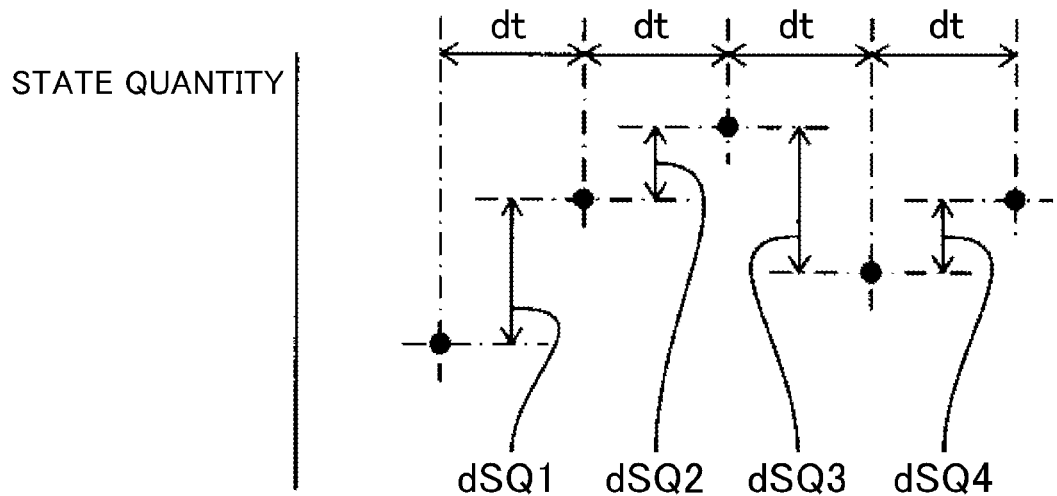
FIG. 8A is a timing chart illustrating a calculation example of a state quantity variability.
Figure 8B:
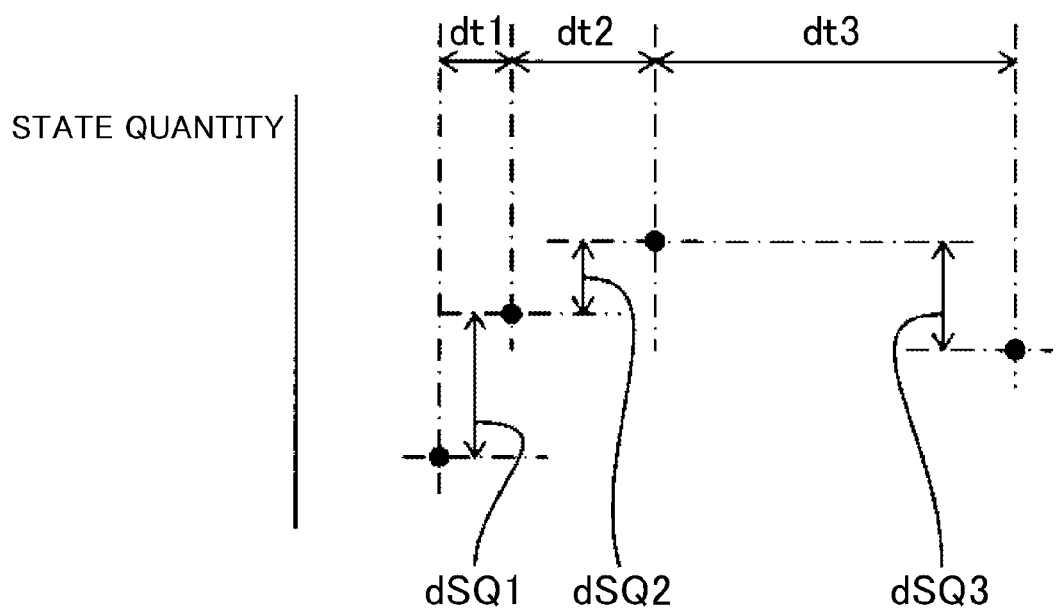
FIG. 8B is a timing chart illustrating a calculation example of a state quantity variability.

In the preparation example of the environment map information M, the LIDAR L of the environment map preparing system repeatedly detects object information, for example, at intervals of several tens of ms. In other words, the LIDAR L of the environment map preparing system detects the object information at a plurality of different times. Accordingly, the state quantity is calculated at a plurality of different times from the object information at the plurality of different times. Alternatively, when a mobile object having the environment map preparing system mounted thereon moves to a predetermined position a plurality of times, the object information at a plurality of different times is also detected and the state quantity at a plurality of different times is also calculated. In FIGS. 8A, 8B, and 8C, various examples of the state quantity of a certain position at a plurality of different times are illustrated.

In the preparation example of the environment map information M, a variation of the state quantity per unit time is calculated and the state quantity variability is calculated on the basis of the variation of the state quantity per unit time. That is, in the example illustrated in FIG. 8A, variations (absolute values) $dsQ1, dsQ2, \ldots$ of the state quantity at the same time interval dt are calculated. In this case, the time interval dt is, for example, the same as the detection time interval of the state quantity. In the example illustrated in FIG. 8A, the variations $dsQ1, dsQ2, \ldots$ of the state quantity are calculated at the continuous time interval dt. In another embodiment, the variations of the state quantity may be calculated at discontinuous time intervals dt. Alternatively, in the example illustrated in FIG. 8B, variations (absolute values) $dsQ1, dsQ2, \ldots$ of the state quantity at a plurality of different time intervals $dt1, dt2, \ldots$ are calculated. The different time intervals are, for example, on the order of seconds, minutes, days, or years. Subsequently, variations per unit time $dsQ1/dt1, dsQ2/dt2, \ldots$ of the state quantity are sequentially calculated. In the example illustrated in FIG. 8B, the variations $dsQ1, dsQ2, \ldots$ of the state quantity are calculated at the continuous time intervals $dt1, dt2, \ldots$. In another embodiment, the variations of the state quantity may be calculated at discontinuous time intervals. Subsequently, the state quantity variability is calculated by simple-averaging or weighted-averaging the variations per unit time $dsQ1/dt1, dsQ2/dt2, \ldots$ of the state quantity. When the weighted average is used, for example, the variation per unit time $dsQ/dt$ of the state quantity of which the detection time is newer is more weighted and the variation per unit time $dsQ/dt$ of the state quantity of which the detection time is older is less weighted. In another embodiment, the variation per unit time $dsQ/dt$ of the state quantity of which the detection time is newer is less weighted, and the variation per unit time $dsQ/dt$ of the state quantity of which the detection time is older is more weighted. The state quantity variability is calculated for a plurality of positions.

In another preparation example of the environment map information M, a plurality of state quantities as a function of time are Fourier-transformed and the state quantity variability is calculated from the result. Specifically, for example, an intensity of a predetermined spectrum (frequency) is calculated as the state quantity variability. In another embodiment, the state quantity variability is calculated by simple-averaging or weighted-averaging the intensities of various spectrums.

On the other hand, in the preparation example of the environment map information M, a state quantity representative value is calculated on the basis of the state quantity of a certain position detected at a plurality of different times. For example, the state quantity representative value of a certain position is set to the newest state quantity of the state quantities of the certain position at a plurality of different times. Then, the state quantity representative value of the certain position indicates the newest state of the certain position. In another example, the state quantity representative value of a certain position is calculated by simple-averaging or weighted-averaging the state quantities of the certain position at a plurality of different times. Then, even when the state quantity of a certain position varies temporarily, the state of the position can be accurately expressed by the state quantity representative value.

Then, the state quantity representative value is stored in correlation with the corresponding position information in the environment map storage unit. The state quantity variability is stored in correlation with the corresponding position information in the environment map storage unit. In this way, the environment map information M is prepared.

In this way, the state quantity representative value and the state quantity variability are correlated with the position information. Accordingly, when the position information is designated, the state quantity representative value and the state quantity variability of the corresponding position can be seen from the environment map information M. In the first embodiment of the disclosure, the environment map information M includes the position information, the state quantity representative values, and the state quantity variabilities of positions in a three-dimensional space and thus is a three-dimensional map. In the first embodiment of the disclosure, the position information is absolute position information. In another embodiment (not illustrated), the position information is relative position information to a predetermined specific position.

The following can be seen from the environment map information M prepared in this way. That is, when the state quantity of a certain position which is expressed by an object presence probability is large and the state quantity variability thereof is low, the position is occupied by a static object (such as a building or a road surface), a dynamic object which remains stationary (such as another vehicle or a pedestrian), or a quasi-static object (such as a standing signboard, a trashcan, or a branch of a tree). Alternatively, an occupied state in which the position is occupied by a dynamic object or a quasi-static object and a non-occupied state in which the position is not occupied by a dynamic object or a quasi-static object are completely switched with a relatively low frequency and a duration of the occupied state is relatively long. On the other hand, when the state quantity of a certain position is small and the state quantity variability thereof is low, there is nothing at the position. A specific example of such a position is a space above a pond. When the state quantity of a certain position is large and the state quantity variability thereof is high, the occupied state and the non-occupied state are completely switched with a relatively high frequency at the position, and a duration of the occupied state is relatively long. A specific example of such a position is a road having a relatively large traffic volume. When the state quantity of a certain position is small and the state quantity variability is high, the occupied state and the non-occupied state are completely switched with a relatively high frequency at the position, and a duration of the non-occupied state is relatively long. A specific example of such a position is a road having a relatively small traffic volume (not zero).

That is, the environment map information M according to the first embodiment of the disclosure includes information on a situation of a certain position as well as information on an object at the position or information on whether there is an object at the position. Accordingly, it is possible to more accurately express a situation in a space.

In the first embodiment of the disclosure, the mobile object having the environment map preparing system mounted thereon is a mobile object other than the vehicle V. In another embodiment (not illustrated), the mobile object having the environment map preparing system mounted thereon is a vehicle V. That is, in the vehicle V, the environment map information M is prepared and is stored in the environment map storage unit 6. In this case, the external sensor 1 and the GPS receiver 2 of the vehicle V constitute the environment detector of the environment map preparing system.

In the first embodiment of the disclosure, a state quantity of a certain position is expressed by a presence probability of an object at the certain position. In another embodiment (not illustrated), a state quantity of a certain position is expressed by a color or a luminance value of an object at the certain position. In this case, for example, it is possible to ascertain which lamp of a traffic signal is lighted. In this embodiment, when the state quantity is expressed by a color of an object, the color of the object is detected by a color camera serving as the camera SO3 of the external sensor 1. On the other hand, when the state quantity is expressed by a luminance value of an object, the luminance value of the object is detected by the LIDAR SO1, the radar SO2, or the color or monochrome camera SO3 of the external sensor 1. That is, the intensity of a reflected beam which is acquired by causing a laser beam emitted from the LIDAR SO1 to be reflected by an object indicates the luminance value of the object. Similarly, the intensity of a reflected wave of the radar SO2 indicates the luminance value of the object. Accordingly, the luminance value of an object is detected by detecting the intensity of a reflected beam or the intensity of a reflected wave. When a state quantity is expressed by a color of an object, the state quantity is digitalized, for example, using an RGB model.

On the other hand, in the first embodiment of the disclosure, one state quantity variability is correlated with one piece of position information. In another embodiment (not illustrated), a plurality of state quantity variabilities are correlated with one piece of position information and thus the environment map information M includes a plurality of state quantity variabilities. In this case, for example, as illustrated in FIG. 8B, a plurality of state quantity variabilities are calculated on the basis of the variation of the state quantity at a plurality of different time intervals. In another example, a plurality of state quantity variabilities are calculated on the basis of the intensities of a plurality of spectrums which are acquired by Fourier-transforming the state quantities.

As described above, the impassable region determining unit 13 determines an impassable region on the basis of the environment map information M. Various examples of the method of determining an impassable region according to the first embodiment of the disclosure will be described below with reference to FIGS. 9 to 13.

Figure 9:
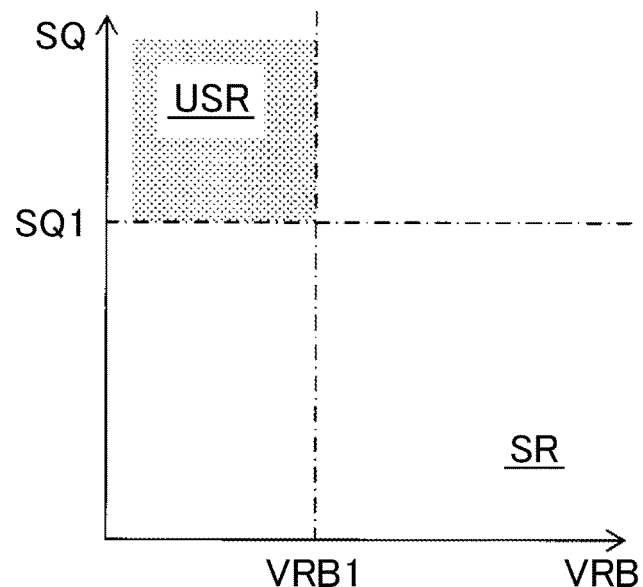
FIG. 9 is a diagram illustrating an example of an impassable region.

In the example illustrated in FIG. 9, in a space in which a vehicle V can travel, a region in which a state quantity representative value SQ is greater than a predetermined first set state quantity representative value SQ1 and a state quantity variability VRB is lower than a predetermined first set state quantity variability VRB1 is determined to be an impassable region USR. A region in which the state quantity representative value SQ is greater than the first set state quantity representative value SQ1 and the state quantity variability VRB is equal to or higher than the first set state quantity variability VRB1 and a region in which the state quantity representative value SQ is equal to or less than the first set state quantity representative value SQ1 regardless of the state quantity variability VRB are determined to be passable regions SR which are suitable for movement of the vehicle.

As described above, in a region in which the state quantity representative value SQ is great and the state quantity variability VRB is low, a static object is present. In the example illustrated in FIG. 9, such a region is determined not to be suitable for travel of the vehicle V by automatic operation and this region is determined to be an impassable region USR. On the other hand, a region in which the set state quantity representative value SQ is great and the state quantity variability is high and a region in which the state quantity representative value SQ is small are determined to be suitable for travel of the vehicle V by automatic operation and such regions are determined to be passable regions SR. In the first embodiment of the disclosure, a region in which the environment map information M is not present, that is, a region in which one or both of the state quantity representative value and the state quantity variability are not calculated, is determined to be an impassable region USR.

Figure 10:
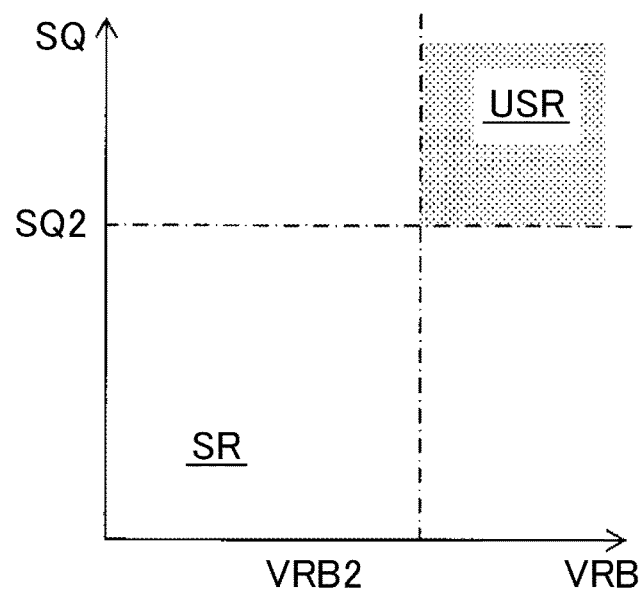
FIG. 10 is a diagram illustrating an example of an impassable region.

In the example illustrated in FIG. 10, a region in which a state quantity representative value SQ is greater than a predetermined second set state quantity representative value SQ2 and a state quantity variability VRB is higher than a predetermined second set state quantity variability VRB2 is determined to be an impassable region USR. A region in which the state quantity representative value SQ is greater than the second set state quantity representative value SQ2 and the state quantity variability VRB is equal to or lower than the second set state quantity variability VRB2 and a region in which the state quantity representative value SQ is equal to or less than the second set state quantity representative value SQ2 regardless of the state quantity variability VRB are determined to be passable regions SR.

Figure 11:
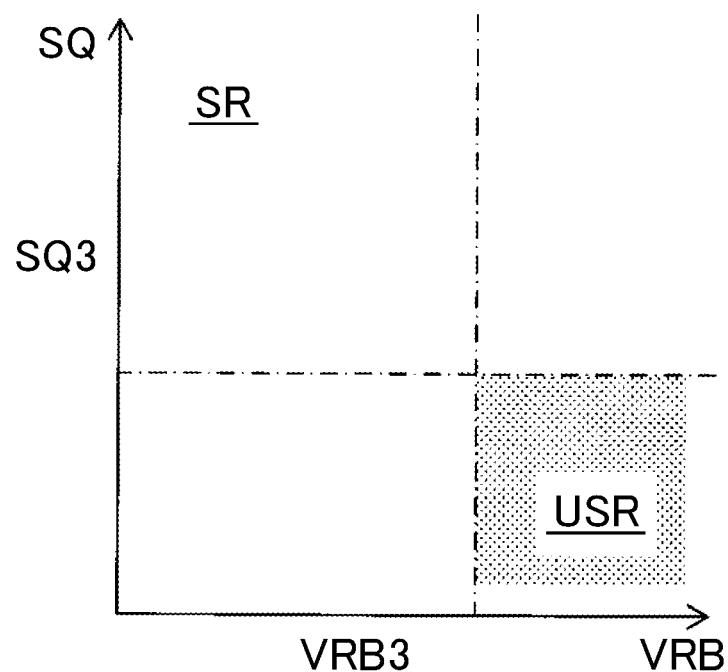
FIG. 11 is a diagram illustrating an example of an impassable region.

In the example illustrated in FIG. 11, a region in which a state quantity representative value SQ is less than a predetermined third set state quantity representative value SQ3 and a state quantity variability VRB is higher than a predetermined third set state quantity variability VRB3 is determined to be an impassable region USR. A region in which the state quantity representative value SQ is less than the third set state quantity representative value SQ3 and the state quantity variability VRB is equal to or lower than the third set state quantity variability VRB3 and a region in which the state quantity representative value SQ is equal to or greater than the third set state quantity representative value SQ3 regardless of the state quantity variability VRB are determined to be passable regions SR.

Figure 12:
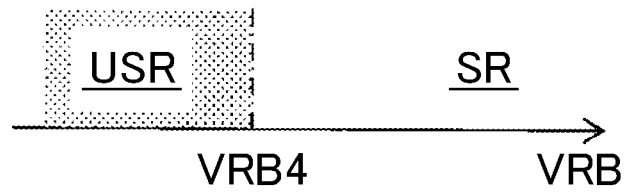
FIG. 12 is a diagram illustrating an example of an impassable region.

In the example illustrated in FIG. 12, a region in which a state quantity variability VRB is lower than a predetermined fourth set state quantity variability VRB4 is determined to be an impassable region USR. A region in which the state quantity variability VRB is equal to or higher than the fourth set state quantity variability VRB4 is determined to be a passable region SR.

Figure 13:
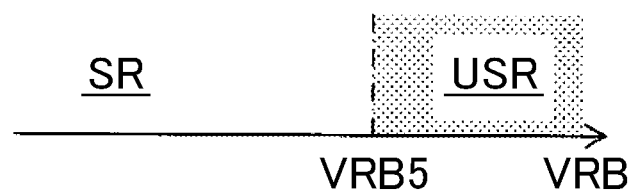
FIG. 13 is a diagram illustrating an example of an impassable region.

In the example illustrated in FIG. 13, a region in which a state quantity variability VRB is higher than a predetermined fifth set state quantity variability VRB5 is determined to be an impassable region USR. A region in which the state quantity variability VRB is equal to or lower than the fifth set state quantity variability VRB5 is determined to be a passable region SR.

Figure 14:
FIG. 14 is a diagram illustrating an example of an impassable region.

In the example illustrated in FIG. 14, a region in which a state quantity representative value SQ is greater than a predetermined fourth set state quantity representative value SQ4 is determined to be an impassable region USR. A region in which the state quantity representative value SQ is equal to or less than the fourth set state quantity representative value SQ4 is determined to be a passable region SR.

In the examples illustrated in FIGS. 12 and 13, the impassable region USR can be said to be determined regardless of the state quantity representative value SQ. On the other hand, in the example illustrated in FIG. 14, the impassable region USR can be said to be determined regardless of the state quantity variability VRB.

Figure 15A:
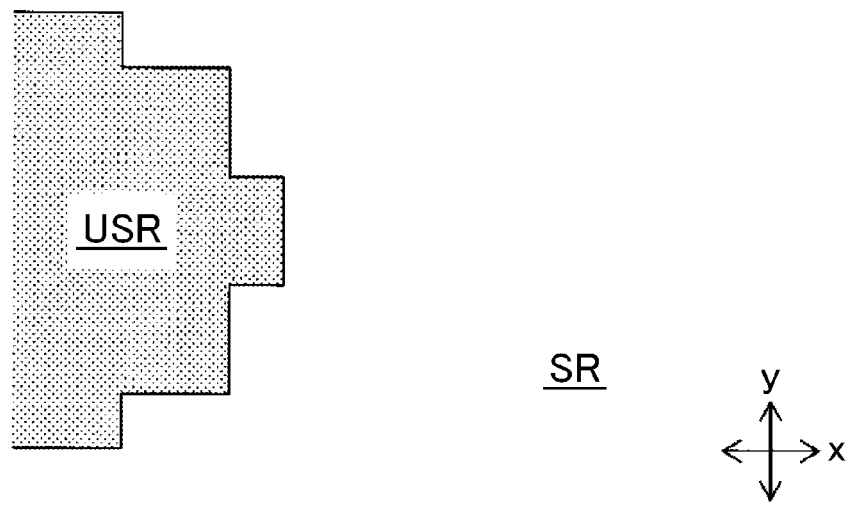
FIG. 15A is a diagram illustrating an example of a two-dimensional map of an impassable region USR and a passable region SR.

FIG. 15A illustrates an example in which an impassable region USR and a passable region SR are represented in the form of a two-dimensional map. In the example illustrated in FIG. 15A, x represents latitude and y represents longitude. The two-dimensional map is prepared, for example, as follows.

Figure 15B:
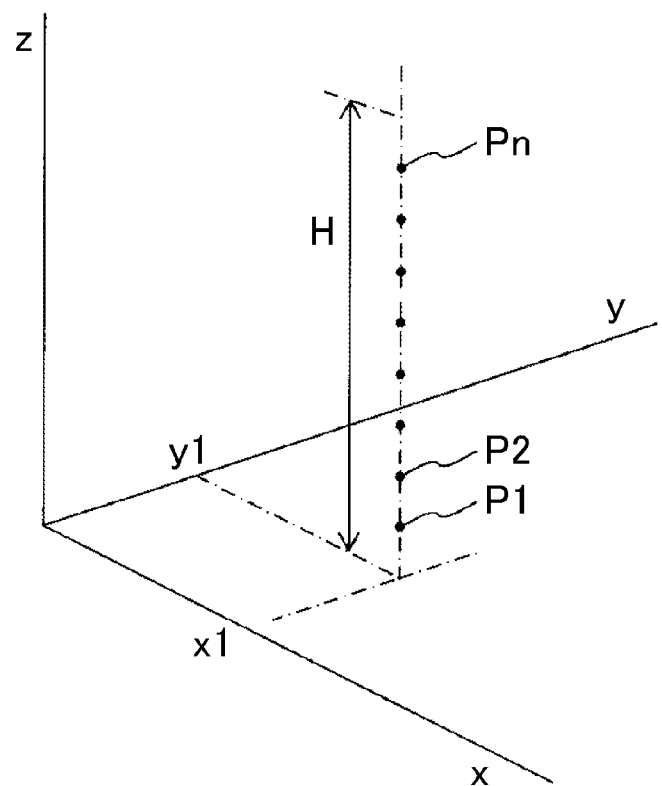
FIG. 15B is a diagram illustrating a preparation example of a two-dimensional map of an impassable region USR and a passable region SR.

The environment map information M includes state quantity variabilities VRB and state quantity representative values SQ of a plurality of positions which have the same latitude x and longitude y and different altitudes z. In FIG. 15B, a plurality of positions P1, P2, . . . , Pn which have the same latitude x and longitude y of (x1, y1) and different altitudes z are illustrated up to a predetermined value H which is determined depending on the height of the vehicle V from a road surface. The predetermined value H is, for example, a value obtained by adding a predetermined value to the height of the vehicle V. It is determined whether each of the positions P1, P2, . . . , Pn is an impassable region USR. That is, in the example illustrated in FIG. 9, it is determined for each of the positions P1, P2, . . . , Pn whether the state quantity representative value SQ is greater than the first set state quantity representative value SQ1 and the state quantity variability VRB is lower than the first set state quantity variability VRB1. When it is determined that at least one position of the positions P1, P2, . . . , Pn is an impassable region USR, the position (x1, y1) on the xy plane is an impassable region USR. On the other hand, when it is determined that all of the positions P1, P2, . . . , Pn are impassable regions USR, the position (x1, y1) on the xy plane is a passable region SR. The same process is performed on a variety of latitudes x and longitudes y, and thus an impassable region USR and a passable region SR are represented in the form of a two-dimensional map.

As described above, in the first embodiment of the disclosure, the route generating unit 12c generates a route P on the basis of the impassable region determined by the impassable region determining unit 13. Various examples of a route P based on the impassable region USR will be described below.

Figure 16:
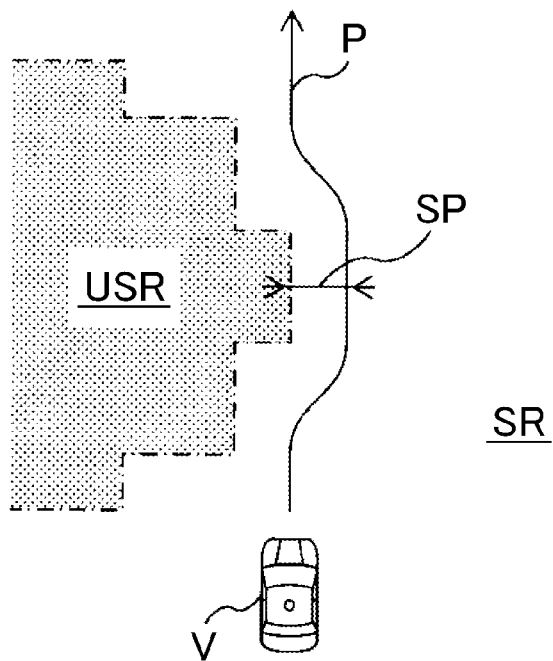
FIG. 16 is a schematic diagram illustrating a route P.

In a first example of a route P, the route P is generated to bypass the impassable region USR as illustrated in FIG. 16. In the first example of a route P, the route P is determined such that a distance SP between the vehicle V and the impassable region USR is greater than a predetermined first set distance SP1. Accordingly, it is possible to more safely and more satisfactorily perform automatic operation of the vehicle V. The route P is generated to bypass an object or an obstacle recognized by the surrounding recognizing unit 12a. Accordingly, in the first example of the route P, the route P is generated to bypass the impassable region USR and an obstacle.

In a second example of a route P, when the distance SP between the vehicle V and the impassable region USR is smaller than a predetermined second set distance SP2, the route P is generated such that the speed of the vehicle V when the vehicle V passes by the impassable region USR is lower than that in the case in which the distance SP is larger than the second set distance SP2. As a result, in this example, it is possible to secure more safe and more satisfactory automatic operation of a vehicle V. When the vehicle V is located within the impassable region USR, the distance SP between the vehicle V and the impassable region USR is smaller than the second set distance SP2.

Figure 17:
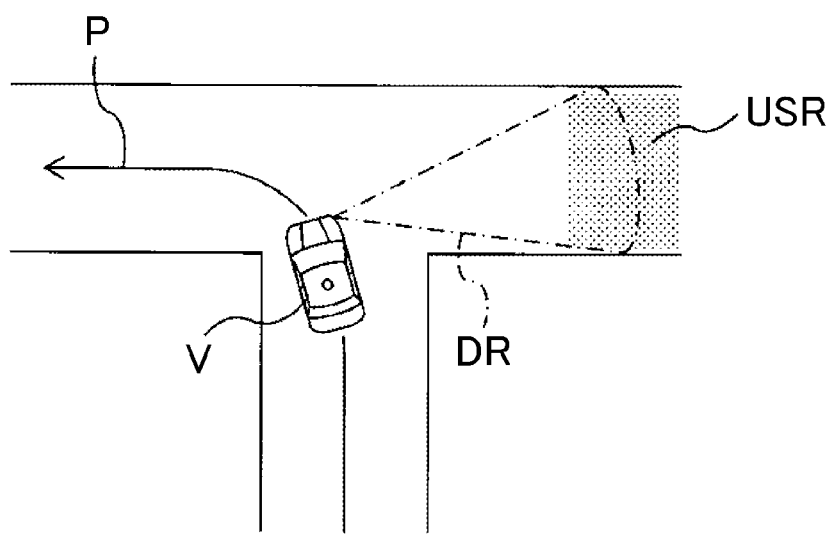
FIG. 17 is a schematic diagram illustrating a route P.

In a third example of a route P, the route P is generated such that a detection direction of the external sensor 1, for example, an emission direction of radio waves from the radar SO2, orients the impassable region USR as illustrated in FIG. 17. Accordingly, it is possible to more satisfactorily ascertain the situation of the impassable region USR using the external sensor 1. In the example illustrated in FIG. 17, the detection direction of the external sensor 1 is fixed relative to the vehicle V.

In the above-mentioned first to third examples of the route P, the route P can be said to be generated on the basis of a positional relationship between the impassable region USR and the vehicle V. On the other hand, in fourth and fifth examples of the route P, the route P of the vehicle V is determined on the basis of a positional relationship between the impassable region USR and another vehicle VZ.

Figure 18:
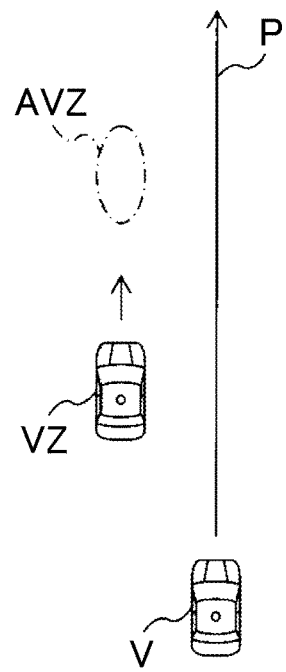
FIG. 18 is a schematic diagram illustrating a route P.
Figure 19:
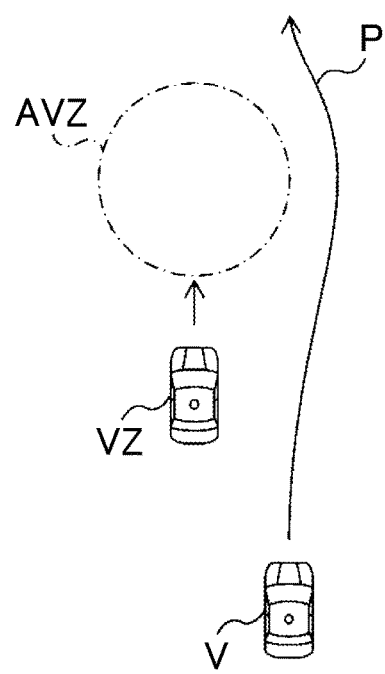
FIG. 19 is a schematic diagram illustrating a route P.

That is, in the fourth example of the route P, for example, when another vehicle VZ is recognized as a dynamic object near the vehicle V, a range AVZ in which the vehicle VZ can be located after the above-mentioned time Δt elapses is predicted as illustrated in FIGS. 18 and 19. The route generating unit 12c generates the route P of the vehicle V to avoid the predicted range AVZ. In the fourth example of the route P, when it is recognized that another vehicle VZ is present in the impassable region USR, the predicted range AVZ is set to be larger than that when the vehicle VZ is located in a passable region SR. When another vehicle VZ is located in the impassable region USR, there is a high possibility of behavior of the vehicle VZ being destabilized in comparison with the case in which the vehicle VZ is located in a passable region SR. FIG. 18 illustrates an example in which another vehicle VZ is located in a passable region SR. In this case, the predicted range AVZ is relatively small. On the other hand, FIG. 19 illustrates an example in which another vehicle VZ is located in an impassable region USR. In this case, the predicted range AVZ is relatively large. As a result, the route P in the example illustrated in FIG. 18 has a linear shape, but the route P in the example illustrated in FIG. 19 has a curved shape.

In the fifth example of the route P, when a distance SPZ between another vehicle VZ and an impassable region USR is smaller than a predetermined third set distance SP3, the route P of the vehicle V is generated such that the speed of the vehicle V when the vehicle V passes by or overtakes another vehicle VZ is lower than that when the distance SPZ is larger than the third set distance SP3. When the vehicle V is located in the impassable region USR, the distance SPZ between another vehicle VZ and the impassable region USR is smaller than the third set distance SP3.

Figure 20:
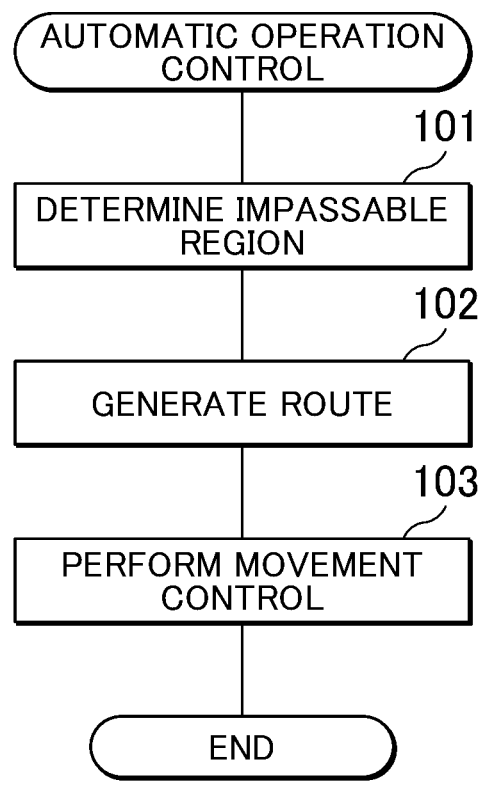
FIG. 20 is a flowchart illustrating an automatic operation control routine according to the first embodiment of the disclosure.

FIG. 20 illustrates a routine for performing the automatic operation control according to the first embodiment of the disclosure. This routine is repeatedly performed when the automatic operation control is to be performed. Referring to FIG. 20, an impassable region USR is determined in Step 101. In Step 102, a route P is generated. In Step S103, movement control of the vehicle V is performed.

As described above with reference to FIGS. 1 and 3, the electronic control unit 10 according to the first embodiment of the disclosure includes processing units such as the surrounding recognizing unit 12a, the self-position determining unit 12b, the route generating unit 12c, the movement control unit 12d, and the impassable region determining unit 13. The processing units perform the processes using calculation resources (such as a CPU time and a memory capacity used) of the electronic control unit 10.

When the vehicle V travels in an impassable region USR or in the vicinity thereof, it is preferable that the route P be more accurately generated than when the vehicle V travels away from the impassable region USR. Therefore, in the first embodiment of the disclosure, the route generating unit 12c is configured to increase an amount of calculation resources of the electronic control unit 10 which are used by the route generating unit 12c when the distance SP between the vehicle V and the impassable region USR is smaller than a predetermined fourth set distance SP4, in comparison with the case in which the distance SP is larger than the fourth set distance SP4. When the amount of calculation resources which are used by the route generating unit 12c increases, an amount of calculation resources which are used by the processing units other than the route generating unit 12c in the electronic control unit 10 decreases.

On the other hand, it is preferable that a situation of an impassable region USR be recognized as specifically as possible. Therefore, in the first embodiment of the disclosure, the surrounding recognizing unit 12a is configured to increase an amount of calculation resources which are used by the surrounding recognizing unit 12a when an impassable region USR is recognized, in comparison with a case in which a passable region SR is recognized.

In a first other example of the surrounding recognizing unit 12a, the detection direction of the external sensor 1 can be changed with respect to the vehicle V and the surrounding recognizing unit 12a is configured to direct the detection direction of the external sensor 1 to the impassable region USR.

In a second other example of the surrounding recognizing unit 12a, the surrounding recognizing unit 12a is configured to increase an amount of calculation resources which are used by the surrounding recognizing unit 12a when the distance SP between the vehicle V and an impassable region USR is smaller than a predetermined fifth set distance SP5, in comparison with a case in which the distance SP is larger than the fifth set distance SP5.

In a third other example of the surrounding recognizing unit 12a, the surrounding recognizing unit 12a is configured to shorten a detection cycle of the external sensor 1 and to decrease detection accuracy thereof when an impassable region USR is recognized, in comparison with a case in which a passable region SR is recognized. Accordingly, it is possible to cope with sudden movement of an obstacle.

In a fourth other example of the surrounding recognizing unit 12a, the surrounding recognizing unit 12a is configured to extend a detection cycle of the external sensor 1 and to increase detection accuracy thereof when an impassable region USR is recognized, in comparison with a case in which a passable region SR is recognized. Accordingly, it is possible to realize automatic operation with good riding quality. This is particularly effective when the vehicle V travels at a low speed, in comparison with the fourth other example of the surrounding recognizing unit 12a.

In the first embodiment of the disclosure, a driver is notified one or both of a state in which the vehicle V is located in an impassable region USR and a state in which the vehicle V gets close to the impassable region USR via the HMI 8. As a result, the driver can prepare for manual operation.

As described above, in the first embodiment of the disclosure, the movement control unit 12d is configured to control the vehicle V such that the vehicle V travels along the route P. In this case, when responsiveness of the movement control unit 12d is high, the control of the vehicle V by the movement control unit 12d is rapidly performed in comparison with a case in which the responsiveness of the movement control unit 12d is low. In the first embodiment of the disclosure, when the distance SP between the vehicle V and an impassable region USR is smaller than a predetermined sixth set distance SP6, the responsiveness of the movement control unit 12d is improved in comparison with a case in which the distance SP is larger than the sixth set distance SP6. As a result, it is possible to more satisfactorily avoid a risk.

On the other hand, for example, when an obstacle moves suddenly to the front side of the vehicle V and steering by the movement control unit 12d and steering by a driver are performed together, there is a possibility of the vehicle V being excessively steered. Therefore, in another embodiment (not illustrated), when the distance SP between the vehicle V and an impassable region USR is smaller than the sixth set distance SP6, the responsiveness of the movement control unit 12d decreases in comparison with a case in which the distance SP is larger than the sixth set distance SP6. As a result, it is possible to suppress excessive control of the vehicle V.

Figure 21:
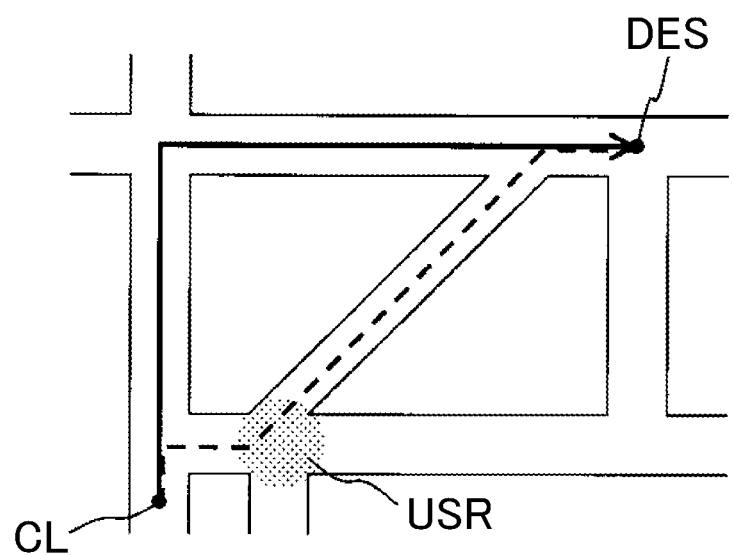
FIG. 21 is a schematic diagram illustrating an example of a target route.

As described above, the navigation system 7 computes a target route from a current location to a destination. In the first embodiment of the disclosure, the navigation system 7 computes the target route to satisfy a predetermined computing condition and to avoid an impassable region USR. This computing condition is that the route minimize a time or a distance required from the current location to the destination while observing rules. In FIG. 21, an example of the target route for avoiding the impassable region USR while satisfying the computing condition is indicated by a solid line. In FIG. 21, CL denotes a current location and DES denotes a destination. In FIG. 21, an example of a target route in which the computing condition is satisfied but the impassable region USR is not considered is indicated by a dashed line.

In the first embodiment of the disclosure, as described above, when the driver operates a steering wheel by a predetermined threshold quantity or more, when the driver operates an accelerator pedal by a predetermined threshold quantity or more, or when the driver operates a brake pedal by a predetermined threshold quantity or more, the automatic operation is switched to the manual operation. When the distance SP between the vehicle V and an impassable region USR is smaller than a predetermined seventh set distance SP7, the threshold quantities are set to be smaller than when the distance SP is larger than the seventh set distance SP7. That is, when the vehicle V is located in the impassable region USR or in the vicinity thereof, the automatic operation is easily switched to the manual operation. In another embodiment (not illustrated) of the disclosure, the vehicle V includes an assist mechanism configured to assist the driver with the operation (the operation of the steering wheel, the accelerator pedal, or the brake pedal), and when the distance SP between the vehicle V and an impassable region USR is smaller than a predetermined eighth set distance SP8, a degree of assistance with the operation by the driver increases in comparison with a case in which the distance SP is larger than the eighth set distance SP8. As a result, in any example, when the vehicle V is located in the impassable region USR or in the vicinity thereof, it is possible to allow the driver to avoid a risk more easily.

A second embodiment of the disclosure will be described below. Differences from the first embodiment of the disclosure will be mainly described below.

Figure 22:
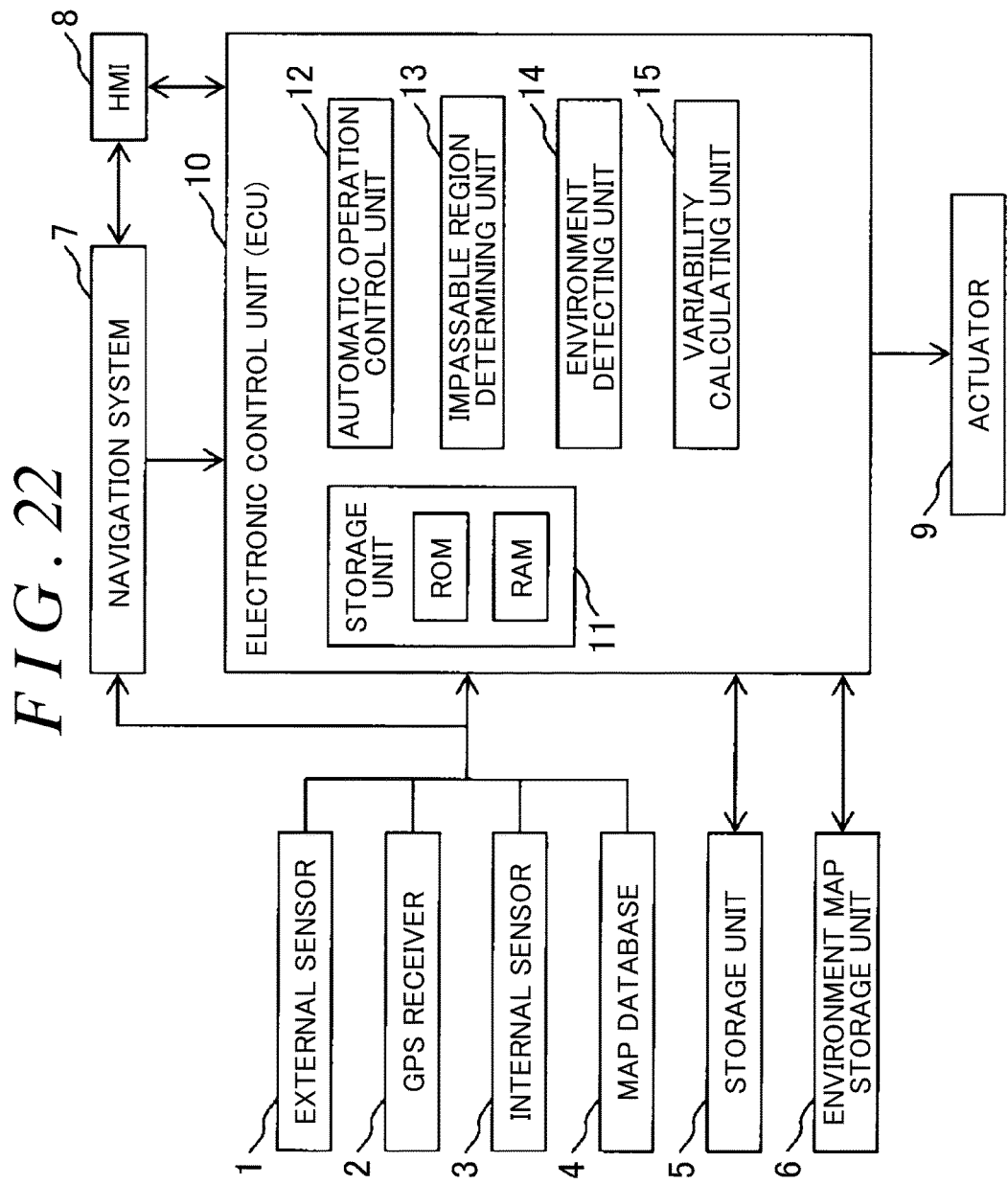
FIG. 22 is a block diagram illustrating an automatic operation control system of a mobile object according to a second embodiment of the disclosure.

FIG. 22 illustrates a block diagram of an automatic operation control system of a mobile object according to the second embodiment of the disclosure. Referring to FIG. 22, the electronic control unit 10 according to the second embodiment of the disclosure additionally includes an environment detecting unit 14 and a variability calculating unit 15.

Similarly to the environment detecting unit of the above-mentioned environment map preparing system, the environment detecting unit 14 is configured to detect position information indicating a position and a state quantity of the position at different times for each of a plurality of positions in a space using the environment detector. In this case, the environment detector includes the external sensor 1 and the GPS receiver 2.

The variability calculating unit 15 is configured to newly calculate the state quantity variability using the detected state quantity for each of the plurality of positions.

In the second embodiment of the disclosure, the impassable region determining unit 13 is configured to determine an impassable region USR on the basis of the state quantity variability of the environment map information M and the newly calculated state quantity variability. More specifically, the impassable region determining unit 13 is configured to determine an impassable region USR on the basis of a deviation dVRB (=|VRB−VRBN|) between the state quantity variability VRB of the environment map information M and the newly calculated state quantity variability VRBN. Various examples of the method of determining an impassable region USR according to the second embodiment of the disclosure will be described below with reference to FIGS. 23 to 27.

Figure 23:
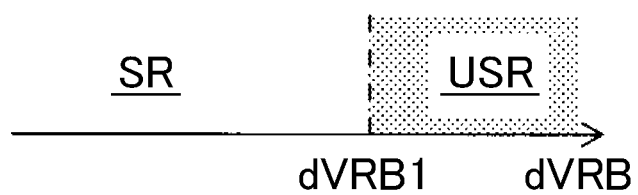
FIG. 23 is a diagram illustrating an example of an impassable region.

In the example illustrated in FIG. 23, in a space in which the vehicle V can travel, a region in which the state quantity variability deviation dVRB is larger than a predetermined first set variability deviation dVRB1 is determined to be an impassable region USR. A region in which the state quantity variability deviation dVRB is equal to or less than the first set variability deviation dVRB1 is determined to be a passable region SR.

When a state quantity variability VRB of a certain position varies greatly, the situation of the certain position varies greatly. Specifically, for example, a case in which a building is constructed at the certain position and the number of persons entering and leaving the building suddenly increases is considered. In the example illustrated in FIG. 23, such a region is determined not to be suitable for travel of the vehicle V by automatic operation and such a region is determined to be an impassable region USR.

Figure 24:
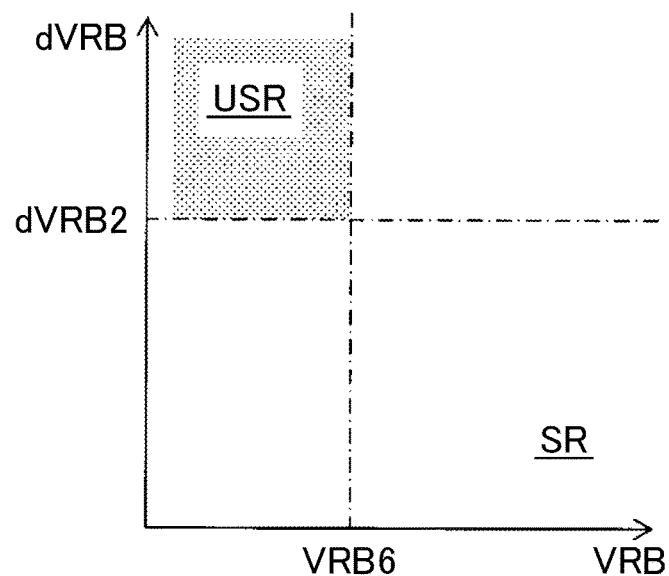
FIG. 24 is a diagram illustrating an example of an impassable region.
Figure 25:
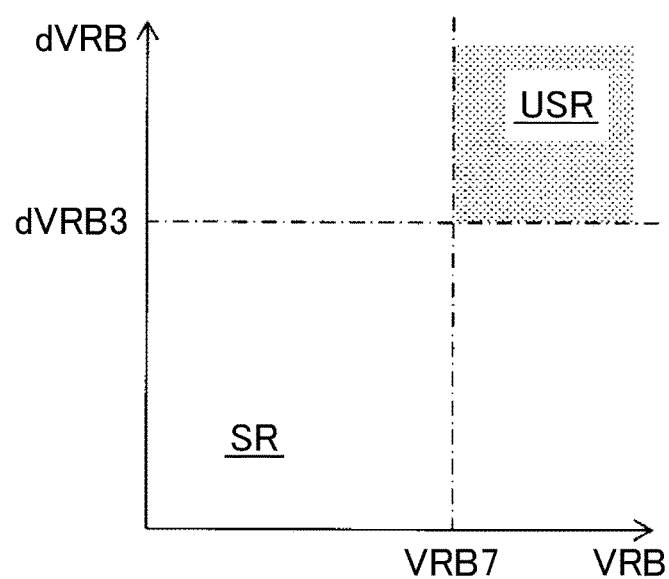
FIG. 25 is a diagram illustrating an example of an impassable region.

In the examples illustrated in FIGS. 24 and 25, the impassable region determining unit 13 is configured to determine an impassable region USR on the basis of the state quantity variability VRB of the environment map information M and the variability deviation dVRB.

In the example illustrated in FIG. 24, a region in which the variability deviation dVRB is larger than a predetermined second set variability deviation dVRB2 and the state quantity variability VRB is lower than a predetermined sixth set state quantity variability VRB6 is determined to be an impassable region USR. A region in which the variability deviation dVRB is larger than the second set variability deviation dVRB2 and the state quantity variability VRB is equal to or higher than the sixth set state quantity variability VRB6 and a region in which the variability deviation dVRB is equal to or less than the second set variability deviation dVRB2 regardless of the state quantity variability VRB are determined to be passable regions SR.

In the example illustrated in FIG. 25, a region in which the variability deviation dVRB is larger than a predetermined third set variability deviation dVRB3 and the state quantity variability VRB is higher than a predetermined seventh set state quantity variability VRB7 is determined to be an impassable region USR. A region in which the variability deviation dVRB is larger than the third set variability deviation dVRB3 and the state quantity variability VRB is equal to or lower than the seventh set state quantity variability VRB7 and a region in which the variability deviation dVRB is equal to or less than the third set variability deviation dVRB3 regardless of the state quantity variability VRB are determined to be passable regions SR.

Figure 26:
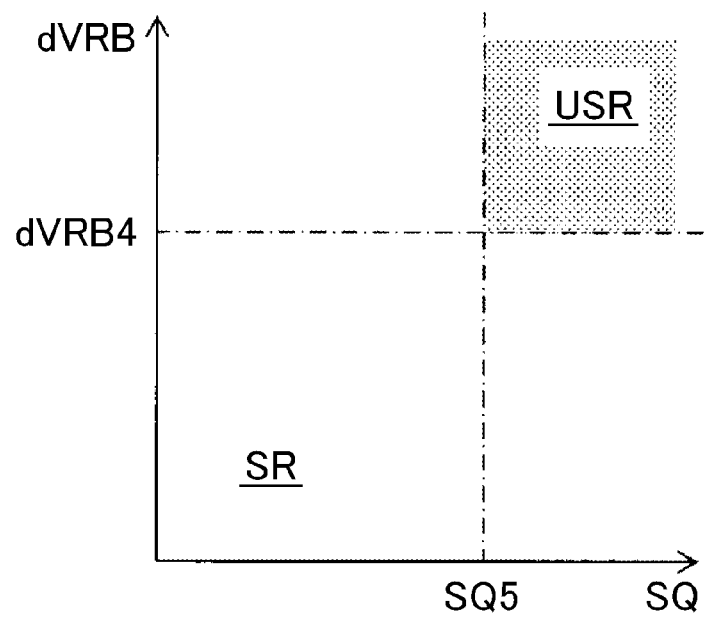
FIG. 26 is a diagram illustrating an example of an impassable region.
Figure 27:
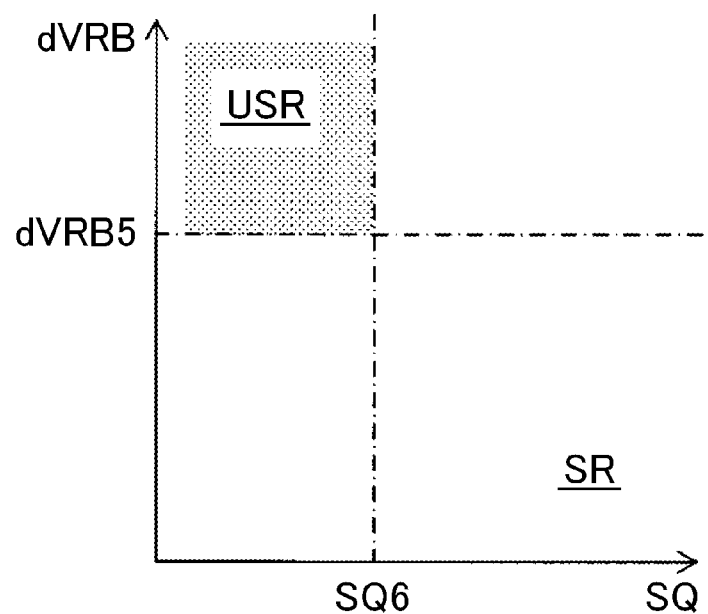
FIG. 27 is a diagram illustrating an example of an impassable region.

In the examples illustrated in FIGS. 26 and 27, the impassable region determining unit 13 is configured to determine an impassable region USR on the basis of the state quantity representative value SQ of the environment map information M and the variability deviation dVRB.

In the example illustrated in FIG. 26, a region in which the variability deviation dVRB is larger than a predetermined fourth set variability deviation dVRB4 and the state quantity representative value SQ is greater than a predetermined fifth set state quantity representative value SQ5 is determined to be an impassable region USR. A region in which the variability deviation dVRB is larger than the fourth set variability deviation dVRB4 and the state quantity representative value SQ is equal to or less than the fifth set state quantity representative value SQ5 and a region in which the variability deviation dVRB is equal to or less than the fourth set variability deviation dVRB4 regardless of the state quantity representative value SQ are determined to be passable regions SR.

In the example illustrated in FIG. 27, a region in which the variability deviation dVRB is larger than a predetermined fifth set variability deviation dVRB5 and the state quantity representative value SQ is lower than a predetermined sixth set state quantity representative value SQ6 is determined to be an impassable region USR. A region in which the variability deviation dVRB is larger than the fifth set variability deviation dVRB5 and the state quantity representative value SQ is equal to or less than the sixth set state quantity representative value SQ6 and a region in which the variability deviation dVRB is equal to or less than the fifth set variability deviation dVRB5 regardless of the state quantity representative value SQ are determined to be passable regions SR.

In the examples illustrated in FIGS. 23 to 25, the impassable region USR can be said to be determined regardless of the state quantity representative value SQ.

In this way, in the second embodiment of the disclosure, since an impassable region USR is determined on the basis of the newly calculated state quantity variability, it is possible to more accurately determine an impassable region USR.

In the second embodiment of the disclosure, a region in which the state quantity is not newly detected and thus the state quantity variability is not newly detected is also determined to be an impassable region USR. That is, in the second embodiment of the disclosure, a region in which the situation cannot be newly ascertained is determined to be unsuitable for the automatic operation of the vehicle V.

Figure 28:
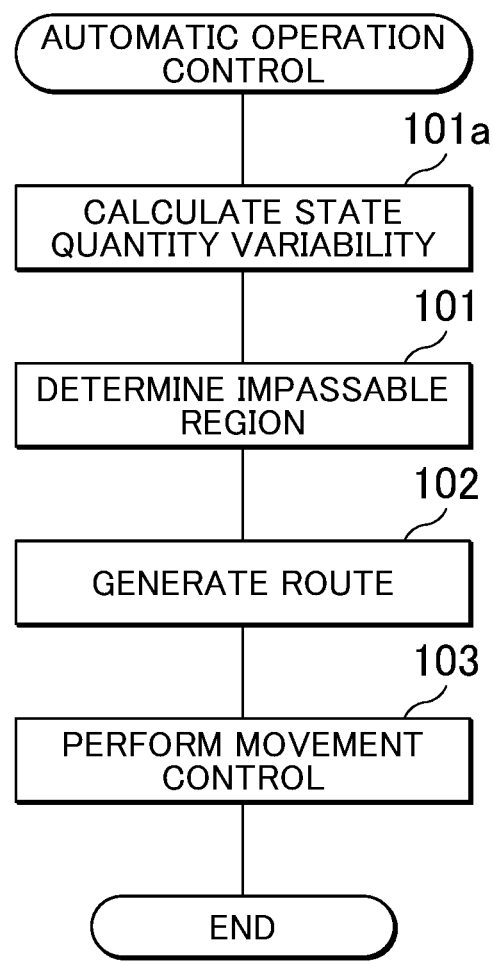
FIG. 28 is a flowchart illustrating an automatic operation control routine according to the second embodiment of the disclosure.

FIG. 28 illustrates a routine for performing the automatic operation control according to the second embodiment of the disclosure. This routine is repeatedly performed when the automatic operation control is to be performed. Referring to FIG. 28, a state quantity variability VRBN is newly calculated in Step 101a. An impassable region USR is determined in Step 101. In Step 102, a route P is generated. In Step S103, movement control of the vehicle V is performed.

A third embodiment of the disclosure will be described below. Differences from the first embodiment of the disclosure will be mainly described below.

Figure 29:
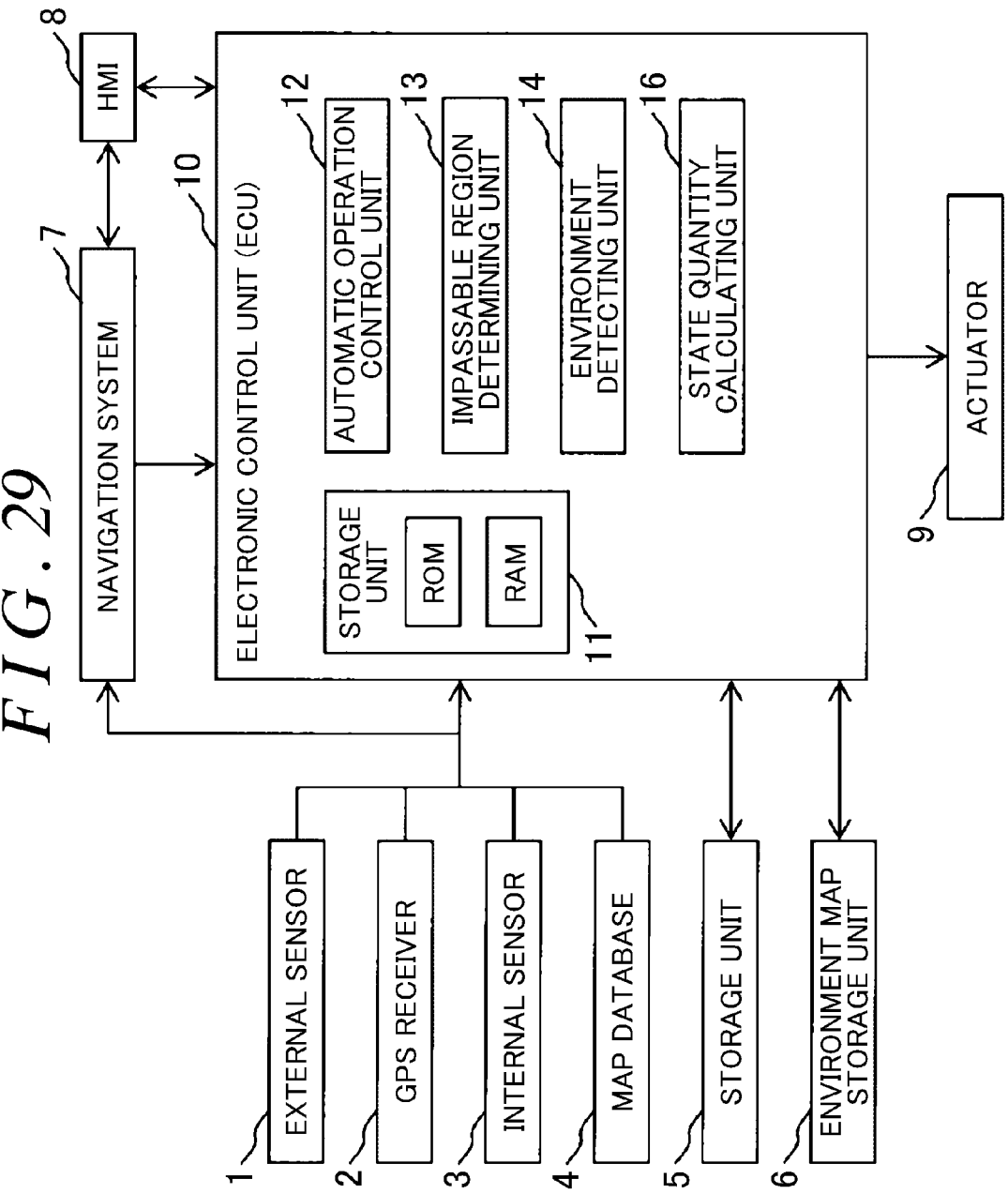
FIG. 29 is a block diagram illustrating an automatic operation control system of a mobile object according to a third embodiment of the disclosure.

FIG. 29 illustrates a block diagram of an automatic operation control system of a mobile object according to the third embodiment of the disclosure. Referring to FIG. 29, the electronic control unit 10 according to the third embodiment of the disclosure additionally includes an environment detecting unit 14 and a state quantity calculating unit 16.

The state quantity calculating unit 16 is configured to newly calculate the state quantity representative value using the detected state quantity for each of a plurality of positions. The environment detecting unit 14 according to the third embodiment of the disclosure is the same as in the second embodiment of the disclosure and thus description thereof will not be repeated.

In the third embodiment of the disclosure, the impassable region determining unit 13 is configured to determine an impassable region USR on the basis of the state quantity variability and the state quantity representative value of the environment map information M and the newly calculated state quantity representative value. More specifically, the impassable region determining unit 13 is configured to determine an impassable region USR on the basis of the state quantity variability VRB of the environment map information M and a deviation dSQ (=|SQ−SQN|) between the state quantity representative value SQ of the environment map information M and the newly calculated state quantity representative value SQN. Various examples of the method of determining an impassable region USR according to the third embodiment of the disclosure will be described below with reference to FIGS. 30 to 32.

Figure 30:
FIG. 30 is a diagram illustrating an example of an impassable region.

In the example illustrated in FIG. 30, in a space in which the vehicle V can travel, a region in which the state quantity representative value deviation dSQ is larger than a predetermined first set representative value deviation dSQ1 is determined to be an impassable region USR. A region in which the state quantity representative value deviation dSQ is equal to or less than the first set representative value deviation dSQ1 is determined to be a passable region SR.

When a state quantity representative value SQ of a certain position varies greatly, the situation of the certain position varies greatly. Specifically, for example, a case in which a building is constructed at the certain position is considered. In the example illustrated in FIG. 30, such a region is determined not to be suitable for travel of the vehicle V by automatic operation and such a region is determined to be an impassable region USR.

Figure 31:
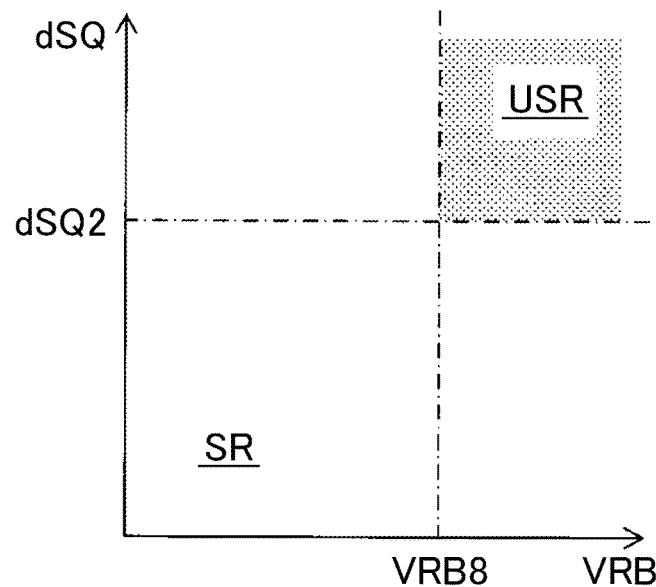
FIG. 31 is a diagram illustrating an example of an impassable region.
Figure 32:
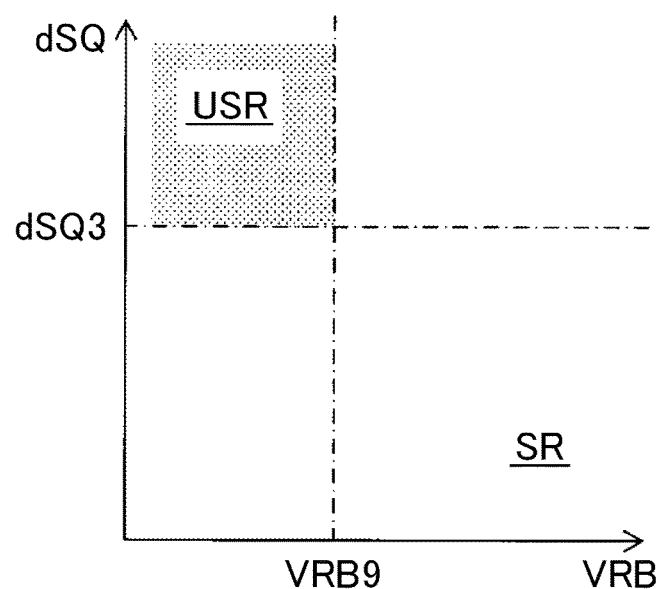
FIG. 32 is a diagram illustrating an example of an impassable region.

In the examples illustrated in FIGS. 31 and 32, the impassable region determining unit 13 is configured to determine an impassable region USR on the basis of the state quantity variability VRB of the environment map information M and the representative value deviation dSQ.

In the example illustrated in FIG. 31, a region in which the representative value deviation dSQ is larger than a predetermined second set representative value deviation dSQ2 and the state quantity variability VRB is higher than a predetermined eighth set state quantity variability VRB8 is determined to be an impassable region USR. A region in which the representative value deviation dSQ is larger than the second set representative value deviation dSQ2 and the state quantity variability VRB is equal to or lower than the eighth set state quantity variability VRB8 and a region in which the representative value deviation dSQ is equal to or less than the second set representative value deviation dSQ2 regardless of the state quantity variability VRB are determined to be passable regions SR.

In the example illustrated in FIG. 32, a region in which the representative value deviation dSQ is larger than a predetermined third set representative value deviation dSQ3 and the state quantity variability VRB is lower than a predetermined ninth set state quantity variability VRB9 is determined to be an impassable region USR. A region in which the representative value deviation dSQ is larger than the third set representative value deviation dSQ3 and the state quantity variability VRB is equal to or higher than the ninth set state quantity variability VRB9 and a region in which the representative value deviation dSQ is equal to or less than the third set representative value deviation dSQ3 regardless of the state quantity variability VRB are determined to be passable regions SR.

Figure 33:
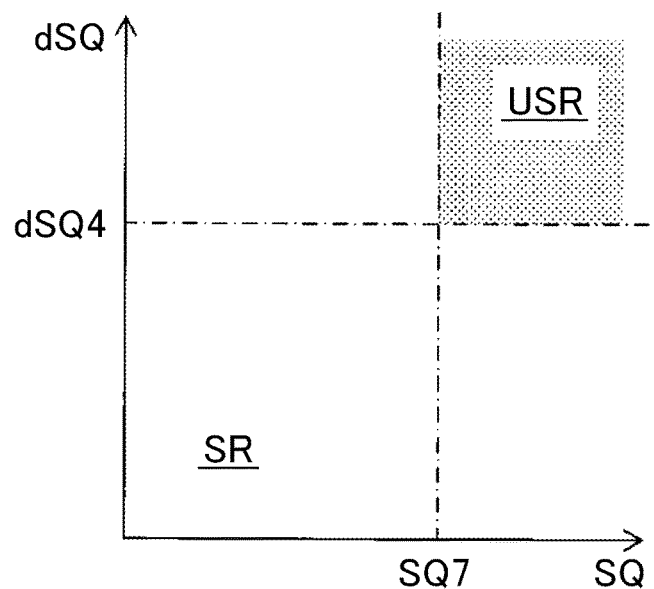
FIG. 33 is a diagram illustrating an example of an impassable region.
Figure 34:
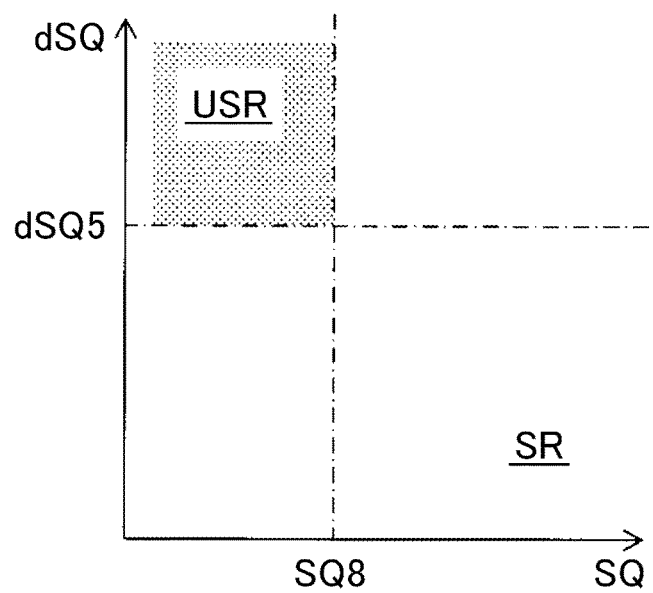
FIG. 34 is a diagram illustrating an example of an impassable region.

In the examples illustrated in FIGS. 33 and 34, the impassable region determining unit 13 is configured to determine an impassable region USR on the basis of the state quantity representative value SQ of the environment map information M and the representative value deviation dSQ.

In the example illustrated in FIG. 33, a region in which the representative value deviation dSQ is larger than a predetermined fourth set representative value deviation dSQ4 and the state quantity representative value SQ is greater than a predetermined seventh set state quantity representative value SQ7 is determined to be an impassable region USR. A region in which the representative value deviation dSQ is larger than the fourth set representative value deviation dSQ4 and the state quantity representative value SQ is equal to or less than the seventh set state quantity representative value SQ7 and a region in which the representative value deviation dSQ is equal to or less than the fourth set representative value deviation dSQ4 regardless of the state quantity representative value SQ are determined to be passable regions SR.

In the example illustrated in FIG. 34, a region in which the representative value deviation dSQ is larger than a predetermined fifth set representative value deviation dSQ5 and the state quantity representative value SQ is less than a predetermined eighth set state quantity representative value SQ8 is determined to be an impassable region USR. A region in which the representative value deviation dSQ is larger than the fifth set representative value deviation dSQ5 and the state quantity representative value SQ is equal to or greater than the eighth set state quantity representative value SQ8 and a region in which the representative value deviation dSQ is equal to or less than the fifth set representative value deviation dSQ5 regardless of the state quantity representative value SQ are determined to be passable regions SR.

In the examples illustrated in FIGS. 33 and 34, the impassable region USR can be said to be determined regardless of the state quantity variability VRB.

In this way, in the third embodiment of the disclosure, since an impassable region USR is determined on the basis of the newly calculated state quantity representative value, it is possible to more accurately determine an impassable region USR.

In the third embodiment of the disclosure, a region in which the state quantity is not newly detected and thus the state quantity representative value is not newly detected is also determined to be an impassable region USR. This is because a region in which the situation cannot be ascertained is unsuitable for the automatic operation of the vehicle V.

Figure 35:
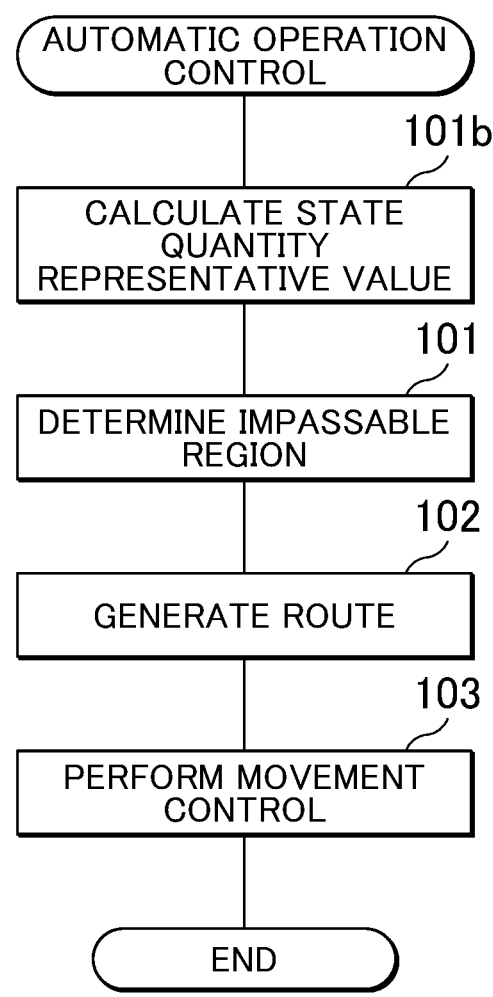
FIG. 35 is a flowchart illustrating an automatic operation control routine according to the third embodiment of the disclosure.

FIG. 35 illustrates a routine for performing the automatic operation control according to the third embodiment of the disclosure. This routine is repeatedly performed when the automatic operation control is to be performed. Referring to FIG. 35, a state quantity representative value SQN is newly calculated in Step 101b. An impassable region USR is determined in Step 101. In Step 102, a route P is generated. In Step S103, movement control of the vehicle V is performed.

In the second embodiment and the third embodiment of the disclosure, similarly to the surrounding recognizing unit 12a, the environment detecting unit 14 is configured to increase an amount of calculation resources which are used by the environment detecting unit 14 when an impassable region USR is recognized (that is, when a state quantity of an impassable region USR is detected), in comparison with a case in which a passable region SR is recognized. In another embodiment (not illustrated), the environment detecting unit 14 is configured to be the same as in the first to fourth other examples of the surrounding recognizing unit 12a.

A fourth embodiment of the disclosure will be described below. Differences from the first embodiment of the disclosure will be mainly described below.

Figure 36:
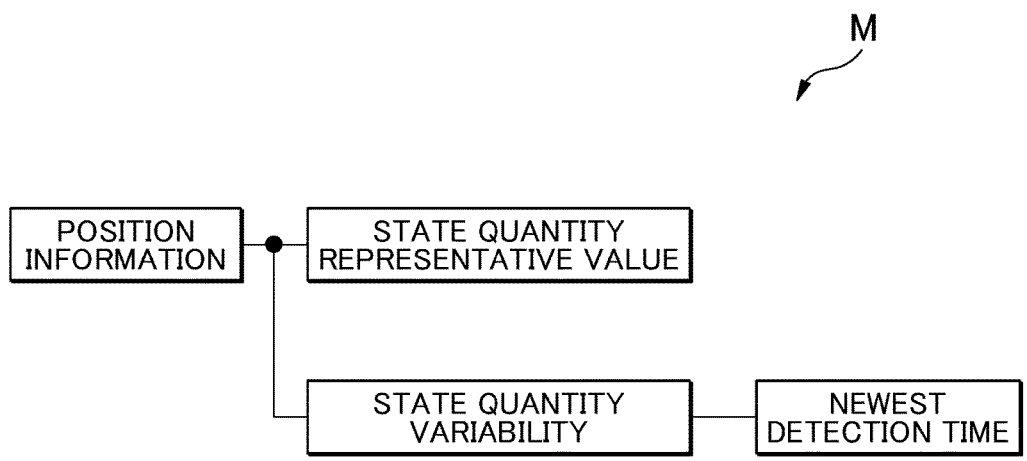
FIG. 36 is a schematic diagram illustrating environment map information according to a fourth embodiment of the disclosure.

FIG. 36 schematically illustrates environment map information M according to the fourth embodiment of disclosure. Environment map information M according to the fourth embodiment of the disclosure additionally includes a newest detection time which is correlated with the corresponding state quantity variability as the newest detection time of the state quantity variability as illustrated in FIG. 36. The newest detection time is the newest among detection times of the state quantity which is used to calculate the corresponding state quantity variability. The newest detection time is also the newest among detection times of the state quantity which is used to calculate the corresponding state quantity representative value. In environment map information M of another embodiment (not illustrated), the newest detection time is correlated with the corresponding state quantity representative value.

In the fourth embodiment of the disclosure, the impassable region determining unit 13 is configured to determine an impassable region USR on the basis of the state quantity variability and the newest detection time of the environment map information M. More specifically, the impassable region determining unit 13 is configured to calculate a difference between the newest detection time and the current time, that is, an elapsed time after the state quantity variability is calculated, and to determine an impassable region USR on the basis of the elapsed time and the state quantity variability. Various examples of the method of determining an impassable region USR according to the fourth embodiment of the disclosure will be described below with reference to FIGS. 37 to 38.

Figure 37:
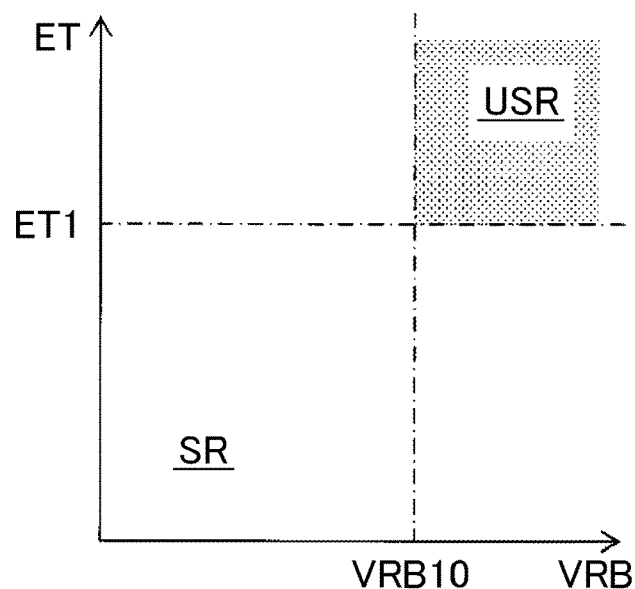
FIG. 37 is a diagram illustrating an example of an impassable region.

In the example illustrated in FIG. 37, in a space in which the vehicle V can travel, a region in which the elapsed time ET is longer than a predetermined first set time ET1 and the state quantity variability VRB is higher than a predetermined tenth set state quantity variability VRB10 is determined to be an impassable region USR. A region in which the elapsed time ET is longer than the first set time ET1 and the state quantity variability VRB is equal to or lower than the tenth set state quantity variability VRB10 and a region in which the elapsed time ET is equal to or shorter than the first set time ET1 regardless of the state quantity variability VRB are determined to be passable regions SR.

When an elapsed time ET correlated with a certain position is long, there is a higher possibility that the situation of the certain position varies in comparison with a case in which the elapsed time ET is short. In the example illustrated in FIG. 37, such a region is determined to be unsuitable for travel of the vehicle V by automatic operation and the region is determined to be an impassable region USR.

Figure 38:
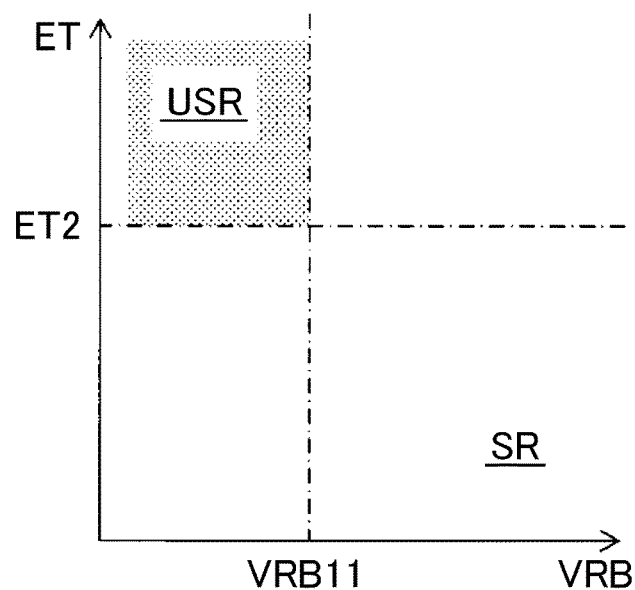
FIG. 38 is a diagram illustrating an example of an impassable region.

In the example illustrated in FIG. 38, a region in which the elapsed time ET is longer than a predetermined second set time ET2 and the state quantity variability VRB is lower than a predetermined eleventh set state quantity variability VRB11 is determined to be an impassable region USR. A region in which the elapsed time ET is longer than the second set time ET2 and the state quantity variability VRB is equal to or higher than the eleventh set state quantity variability VRB11 and a region in which the elapsed time ET is equal to or shorter than the second set time ET2 regardless of the state quantity variability VRB are determined to be passable regions SR.

Figure 39:
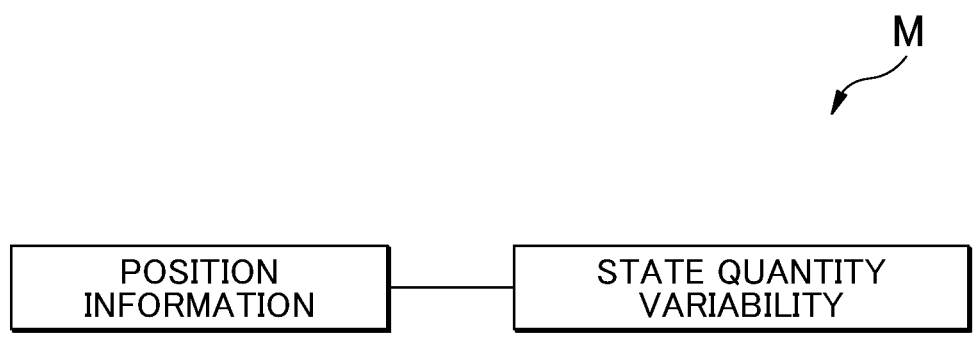
FIG. 39 is a schematic diagram illustrating another example of environment map information.

FIG. 39 illustrates another example of the environment map information M. In the example illustrated in FIG. 39, the environment map information M includes position information indicating a plurality of positions in a space and a state quantity variability correlated with the corresponding position information and does not include a state quantity representative value. In this case, it is also possible to ascertain situations of the plurality of positions using the state quantity variabilities. The environment map information M illustrated in FIG. 39 is used for the examples illustrated in FIGS. 12, 13, 23, 24, and 25.

Figure 40:
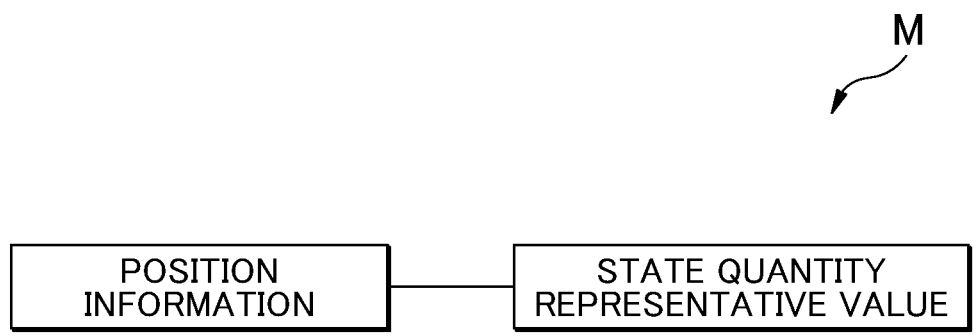
FIG. 40 is a schematic diagram illustrating another example of environment map information.

FIG. 40 illustrates another example of the environment map information M. In the example illustrated in FIG. 40, the environment map information M includes position information indicating a plurality of positions in a space and a state quantity representative value correlated with the corresponding position information and does not include a state quantity variability. In this case, it is also possible to ascertain situations of the plurality of positions using the state quantity representative values. The environment map information M illustrated in FIG. 40 is used for the examples illustrated in FIGS. 14, 30, 33, and 34.

Figure 41:
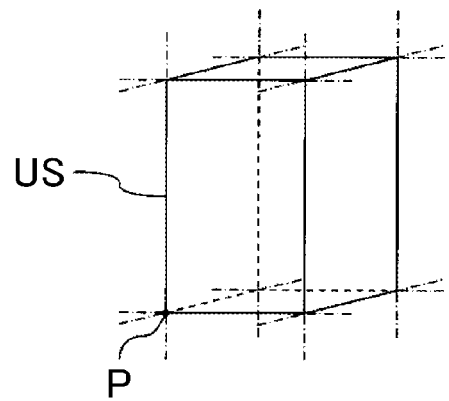
FIG. 41 is a schematic perspective view of a unit space.

Another example of the expression form of the environment map information M will be described below. In the other expression form, the environment map information M is expressed using voxels. That is, a plurality of voxels or unit spaces adjacent to each other are partitioned in a space. An example of a unit space is illustrated in FIG. 41, and the unit space US has a rectangular parallelepiped shape which extends in the vertical direction in the example illustrated in FIG. 41.

In an example in which the environment map information M includes position information, state quantity representative values, and state quantity variabilities as illustrated in FIG. 5, position information, a state quantity representative value, and a state quantity variability are stored for each of a plurality of unit spaces US. In this case, the position information of a unit space US is expressed, for example, by absolute position information of an arbitrary point in the unit space US by P in FIG. 41.

In this case, the state quantity representative value and the state quantity variability of a unit space US are calculated, for example, as follows. That is, first, for each of a plurality of positions in a space, position information and a state quantity are detected and a state quantity representative value and a state quantity variability are calculated using the environment map preparing system. Subsequently, a unit space US to which the positions at which the position information and the state quantity are detected, that is, detection points, belong is specified. Then, the state quantity representative value of the corresponding unit space US is calculated on the basis of the state quantity representative values of the detection points belonging to the specified unit space US. For example, the state quantity representative value of the unit space US is calculated by simple-averaging or weighted-averaging the state quantity representative values of the detection points belonging to the corresponding unit space US. Similarly, the state quantity variability of a unit space US is calculated on the basis of the state quantity variabilities of the detection points belonging to the corresponding unit space US. For example, the state quantity variability of the unit space US is calculated by simple-averaging or weighted-averaging the state quantity variabilities of the detection points belonging to the corresponding unit space US. In this case, the state quantity representative value of the unit space US is correlated with the position information of the unit space US, the state quantity variability of the unit space US is correlated with the position information of the unit space US, environment map information M is prepared as a result, and the environment map information M is stored in the environment map storage unit 6. The state quantity representative values and the state quantity variabilities of the detection points belonging to the unit space US are not stored in the environment map storage unit 6. Accordingly, it is possible to reduce an amount of data stored in the environment map storage unit 6.

When the environment map information M is expressed using voxels in this way, for example, the impassable region determining unit 13 is configured to determine an impassable region USR using the environment map information M stored in the environment map storage unit 6.

Figure 42:
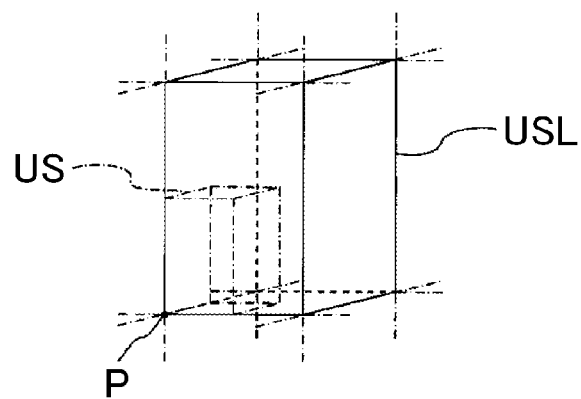
FIG. 42 is a schematic perspective view of another example of a unit space.

In another example, the impassable region determining unit 13 is configured to recalculate the state quantity representative value and the state quantity variability on the basis of a unit space which is larger than the unit space US of the environment map information M stored in the environment map storage unit 6, and to determine the impassable region USR on the basis of the recalculated state quantity representative value and the recalculated state quantity variability. FIG. 42 illustrates a unit space USL with sides having a double length in comparison with the unit space US of the environment map information M stored in the environment map storage unit 6. In this case, an impassable region USR can be roughly determined. An impassable region USR can be simply and rapidly determined.

Figure 43:
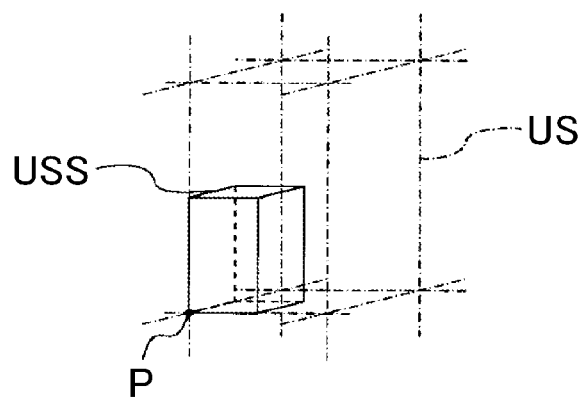
FIG. 43 is a schematic perspective view of another example of a unit space.

In another example, the impassable region determining unit 13 is configured to recalculate the state quantity representative value and the state quantity variability on the basis of a unit space which is smaller than the unit space US of the environment map information M stored in the environment map storage unit 6, and to determine the impassable region USR on the basis of the recalculated state quantity representative value and the recalculated state quantity variability. FIG. 43 illustrates a small unit space USS with sides having a half length in comparison with the unit space US of the environment map information M stored in the environment map storage unit 6. In this case, an impassable region USR can be more finely determined. In this example, the position information and the state quantities detected by the environment map preparing system are stored in the environment map storage unit 6, and the state quantity representative value and the state quantity variability are recalculated using the stored position information and the stored state quantities.

In another embodiment (not illustrated) of the disclosure, at least two of the above-mentioned embodiments are combined. For example, the second embodiment of the disclosure and the third embodiment of the disclosure are combined. That is, the impassable region determining unit 13 is configured to determine an impassable region USR on the basis of the state quantity variability of the environment map information M, a newly calculated state quantity variability, and a newly calculated state quantity representative value. In this case, the electronic control unit 10 includes a storage unit 11, an automatic operation control unit 12, an impassable region determining unit 13, a variability calculating unit 15, and a state quantity calculating unit 16.

In the above description, the first set state quantity variability VRB1 to the eleventh set state quantity variability VRB11 are different from each other. In another example, at least two of the first set state quantity variability VRB1 to the eleventh set state quantity variability VRB11 are equal to each other. In the above description, the first set state quantity representative value SQ1 to the eighth set state quantity representative value SQ8 are different from each other. In another example, at least two of the first set state quantity representative value SQ1 to the eighth set state quantity representative value SQ8 are equal to each other. In the above description, the first set distance SP1 to the eighth set distance SP8 are different from each other. In another example, at least two of the first set distance SP1 to the eighth set distance SP8 are equal to each other. In the above description, the first set variability deviation dVRB1 to the fifth set variability deviation dVRB5 are different from each other. In another example, at least two of the first set variability deviation dVRB1 to the fifth set variability deviation dVRB5 are equal to each other. In the above description, the first set representative value deviation dSQ1 to the fifth set representative value deviation dSQ5 are different from each other. In another example, at least two of the first set representative value deviation dSQ1 to the fifth set representative value deviation dSQ5 are equal to each other. In the above description, the first set time ET1 and the second set time ET2 are different from each other. In another example, the first set time ET1 and the second set time ET2 are equal to each other.

What is claimed is:

1. An automatic operation control system of a mobile object comprising:
    an environment map storage device configured to:
        store environment map information, the environment map information including position information indicating a plurality of positions in a space and a state quantity variability of each of the plurality of positions, the state quantity variability being correlated with corresponding position information, the state quantity variability indicating a variation tendency of a state quantity of a corresponding position with respect to time; and
    one or more processors configured to:
        determine an impassable region which is unsuitable for movement of the mobile object based on the state quantity variability of the environment map information;
        generate a route of the mobile object based on the impassable region; and
        control the mobile object to move along the generated route.

2. The automatic operation control system of a mobile object according to claim 1, wherein the one or more processors are further configured to:
    detect the position information indicating a position and a state quantity of the position at different times for each of the plurality of positions in the space;
    calculate the state quantity variability using the detected state quantity for each of the plurality of positions; and determine the impassable region based on the state quantity variability of the environment map information and newly calculated state quantity variability.

3. The automatic operation control system of a mobile object according to claim 2, wherein the environment map information further includes a state quantity representative value of each of the plurality of positions, the state quantity representative value being correlated with corresponding position information, the state quantity representative value being calculated based on the state quantity, and wherein the one or more processors are further configured to determine the impassable region based on the state quantity variability and the state quantity representative value of the environment map information and the newly calculated state quantity variability.

4. The automatic operation control system of a mobile object according to claim 1, wherein the environment map information further includes a state quantity representative value of each of the plurality of positions, the state quantity representative value being correlated with corresponding position information, the state quantity representative value being calculated based on the state quantity, and wherein the one or more processors are further configured to determine the impassable region based on the state quantity variability and the state quantity representative value of the environment map information.

5. The automatic operation control system of a mobile object according to claim 4, wherein the one or more processors are further configured to:

detect the position information indicating a position in the space and the state quantity of the position;

detect the position information indicating a position and a state quantity of the position at different times for each of the plurality of positions in the space;

calculate the state quantity representative value using the detected state quantity for each of the plurality of positions; and determine the impassable region based on the state quantity variability and the state quantity representative value of the environment map information and newly calculated state quantity representative value.

6. The automatic operation control system of a mobile object according to claim 1, wherein the environment map information further includes a newest detection time of the state quantity variability, the newest detection time being correlated with a corresponding state quantity variability, and wherein the one or more processors are further configured to determine the impassable region based on the state quantity variability and the newest detection time on the environment map information.

7. The automatic operation control system of a mobile object according to claim 1, wherein the one or more processors are further configured to:

determine a position of the mobile object; and generate the route of the mobile object based on a positional relationship between the impassable region and the position of the mobile object.

8. The automatic operation control system of a mobile object according to claim 1, wherein the one or more processors are further configured to:

recognize an object near the mobile object; and generate the route of the mobile object based on a positional relationship between the impassable region and the recognized object.

* * * * *